US007983907B2

(12) United States Patent
Visser et al.

(10) Patent No.: US 7,983,907 B2
(45) Date of Patent: Jul. 19, 2011

(54) HEADSET FOR SEPARATION OF SPEECH SIGNALS IN A NOISY ENVIRONMENT

(75) Inventors: Erik Visser, San Diego, CA (US); Jeremy Toman, San Marcos, CA (US); Tom Davis, San Diego, CA (US); Brian Momeyer, San Diego, CA (US)

(73) Assignees: Softmax, Inc., San Diego, CA (US); The Regents of the University of California, Oakland, CA (US)

( * ) Notice: Subject to any disclaimer, the term of this patent is extended or adjusted under 35 U.S.C. 154(b) by 1214 days.

(21) Appl. No.: 11/572,409

(22) PCT Filed: Jul. 22, 2005

(86) PCT No.: PCT/US2005/026195

§ 371 (c)(1),
(2), (4) Date: Jan. 19, 2007

(87) PCT Pub. No.: WO2006/028587

PCT Pub. Date: Mar. 16, 2006

(65) Prior Publication Data

US 2008/0201138 A1 Aug. 21, 2008

Related U.S. Application Data

(63) Continuation-in-part of application No. 10/897,219, filed on Jul. 22, 2004, now Pat. No. 7,099,821.

(51) Int. Cl.
*G10L 21/02* (2006.01)
*H04B 15/00* (2006.01)

(52) U.S. Cl. ....... 704/227; 381/94.1; 381/150; 455/570; 455/575.1

(58) Field of Classification Search .................. 704/200, 704/226, 227; 381/94.1, 150; 455/569.1, 455/570, 575.1, 575.2
See application file for complete search history.

(56) References Cited

U.S. PATENT DOCUMENTS 4,649,505 A 3/1987 Zinser, Jr. et al.
4,912,767 A 3/1990 Chang
(Continued)

FOREIGN PATENT DOCUMENTS

EP 1 006 652 A2 6/2000
(Continued)

OTHER PUBLICATIONS

Office Action dated Jul. 27, 2009, issued in European Patent Application No. 05810444.

(Continued)

*Primary Examiner* — Martin Lerner
(74) *Attorney, Agent, or Firm* — Knobbe Martens Olson & Bear LLP

(57) ABSTRACT

A headset is constructed to generate an acoustically distinct speech signal in a noisy acoustic environment. The headset positions a pair of spaced-apart microphones near a user's mouth. The microphones each receive the user's speech, and also receive acoustic environmental noise. The microphone signals, which have both a noise and information component, are received into a separation process. The separation process generates a speech signal that has a substantial reduced noise component. The speech signal is then processed for transmission. In one example, the transmission process includes sending the speech signal to a local control module using a Bluetooth radio.

20 Claims, 15 Drawing Sheets

U.S. PATENT DOCUMENTS

| | | | | | |
|---|---|---|---|---|---|
| 5,208,786 | A | | 5/1993 | Weinstein et al. | |
| 5,251,263 | A | | 10/1993 | Andrea et al. | |
| 5,327,178 | A | | 7/1994 | McManigal | |
| 5,353,376 | A | | 10/1994 | Oh et al. | |
| 5,375,174 | A | | 12/1994 | Denenberg | |
| 5,383,164 | A | | 1/1995 | Sejnowski et al. | |
| 5,675,659 | A | * | 10/1997 | Torkkola | 381/94.1 |
| 5,706,402 | A | | 1/1998 | Bell | |
| 5,715,321 | A | | 2/1998 | Andrea et al. | |
| 5,732,143 | A | | 3/1998 | Andrea et al. | |
| 5,770,841 | A | | 6/1998 | Moed et al. | |
| 5,999,567 | A | | 12/1999 | Torkkola | |
| 5,999,956 | A | | 12/1999 | Deville | |
| 6,002,776 | A | | 12/1999 | Bhadkamkar et al. | |
| 6,061,456 | A | * | 5/2000 | Andrea et al. | 381/71.6 |
| 6,108,415 | A | | 8/2000 | Andrea | |
| 6,130,949 | A | | 10/2000 | Aoki et al. | |
| 6,151,397 | A | * | 11/2000 | Jackson et al. | 381/71.4 |
| 6,167,417 | A | | 12/2000 | Parra et al. | |
| 6,343,268 | B1 | * | 1/2002 | Balan et al. | 704/228 |
| 6,381,570 | B2 | | 4/2002 | Li et al. | |
| 6,424,960 | B1 | | 7/2002 | Lee et al. | |
| 6,526,148 | B1 | | 2/2003 | Jourjine et al. | |
| 6,549,630 | B1 | | 4/2003 | Bobisuthi | |
| 6,606,506 | B1 | | 8/2003 | Jones | |
| 6,738,482 | B1 | * | 5/2004 | Jaber | 381/94.7 |
| 6,778,674 | B1 | * | 8/2004 | Panasik et al. | 381/313 |
| 6,879,952 | B2 | * | 4/2005 | Acero et al. | 704/222 |
| 6,898,612 | B1 | * | 5/2005 | Parra et al. | 708/405 |
| 7,099,821 | B2 | | 8/2006 | Visser et al. | |
| 7,167,568 | B2 | * | 1/2007 | Malvar et al. | 381/66 |
| 7,295,972 | B2 | * | 11/2007 | Choi | 704/226 |
| 7,315,816 | B2 | * | 1/2008 | Gotanda et al. | 704/226 |
| 7,366,662 | B2 | * | 4/2008 | Visser et al. | 704/227 |
| 7,383,178 | B2 | * | 6/2008 | Visser et al. | 704/227 |
| 7,464,029 | B2 | * | 12/2008 | Visser et al. | 704/210 |
| 7,496,387 | B2 | * | 2/2009 | Byford et al. | 455/575.2 |
| 7,515,721 | B2 | * | 4/2009 | Tashev et al. | 381/92 |
| 7,587,053 | B1 | * | 9/2009 | Pereira | 381/77 |
| 7,613,310 | B2 | * | 11/2009 | Mao | 381/94.7 |
| 7,706,525 | B2 | * | 4/2010 | King | 379/392 |
| 7,742,746 | B2 | * | 6/2010 | Xiang et al. | 455/63.1 |
| 2001/0037195 | A1 | | 11/2001 | Acero et al. | |
| 2002/0110256 | A1 | | 8/2002 | Watson et al. | |
| 2002/0136328 | A1 | | 9/2002 | Shimizu | |
| 2002/0193130 | A1 | | 12/2002 | Yang et al. | |
| 2003/0046038 | A1 | * | 3/2003 | Deligne et al. | 702/190 |
| 2003/0055535 | A1 | * | 3/2003 | Voeller et al. | 700/279 |
| 2003/0055735 | A1 | | 3/2003 | Cameron et al. | |
| 2003/0179888 | A1 | | 9/2003 | Burnett et al. | |
| 2003/0233227 | A1 | * | 12/2003 | Rickard et al. | 704/200 |
| 2004/0039464 | A1 | | 2/2004 | Virolainen et al. | |
| 2004/0120540 | A1 | | 6/2004 | Mullenborn et al. | |
| 2004/0136543 | A1 | | 7/2004 | White et al. | |
| 2005/0272477 | A1 | * | 12/2005 | Boykins et al. | 455/569.1 |
| 2006/0053002 | A1 | * | 3/2006 | Visser et al. | 704/200 |
| 2007/0147635 | A1 | * | 6/2007 | Dijkstra et al. | 381/94.1 |
| 2008/0208538 | A1 | * | 8/2008 | Visser et al. | 702/190 |
| 2008/0269926 | A1 | * | 10/2008 | Xiang et al. | 700/94 |
| 2009/0001262 | A1 | * | 1/2009 | Visser et al. | 250/282 |
| 2009/0022336 | A1 | * | 1/2009 | Visser et al. | 381/94.7 |
| 2009/0164212 | A1 | * | 6/2009 | Chan et al. | 704/226 |
| 2009/0238377 | A1 | * | 9/2009 | Ramakrishnan et al. | 381/92 |

FOREIGN PATENT DOCUMENTS

| | | | |
|---|---|---|---|
| EP | 1439526 | A | 7/2004 |
| WO | WO 01/27874 | | 4/2001 |
| WO | WO 2004/053839 | A1 | 6/2004 |
| WO | WO 2006/012578 | | 2/2006 |
| WO | WO 2006/028587 | | 3/2006 |

OTHER PUBLICATIONS

Murata, Ikeda. 1998. An On-line Algorithm for Blind Source Separation on Speech Signals. *Proc. of 1998 International Symposium on Nonlinear Theory and its Application* (NOLTA98), pp. 923-926, Le Regent, Crans-Montana, Switzerland.

International Search Report from the EPO, Reference No. P400550, dated Oct. 15, 2007, in regards to European Publication No. EP1570464.

Extended European Search Report dated May 27, 2009 for European Application No. EP 05810444.

Extended European Search Report dated Oct. 14, 2009 for EP Application No. 05778314.

Amari, et al. 1996. A new learning algorithm for blind signal separation. In D. Touretzky, M. Mozer, and M, Hasselmo (Eds.), *Advances in Neural information Processing Systems 8* (pp. 757-763). Cambridge: MIT Press.

Amari, et al. 1997. Stability analysis of learning algorithms for blind source separation. *Neural Networks*, 10(8):1345-1351.

Bell, et al. 1995. An information-maximization approach to blind separation and blind deconvolution, *Neural Computation*, 7:1129-1159.

Cardoso, J-F. 1992. Fourth-order cumulant structure forcing. Application to blind array processing. *Proc. IEEE SP Workshop on SSAP-92*, 136-139.

Comon, P. 1994. Independent component analysis, A new concept? *Signal Processing*, 36:287-314.

Griffiths, et al. 1982. An alternative approach to linearly constrained adaptive beamforming. *IEEE Transactions on Antennas and Propagation*, AP-30(1):27-34.

Herault, et al.(1986). Space or time adaptive signal processing by neural network models. Neural Networks for Computing. In J. S. Denker (Ed.), *Proc. of the AIP Conference* (pp. 206-211). New York: American Institute of Physics.

Hoshuyama, et al. 1999. A robust adaptive beamformer for microphone arrays with a blocking matrix using constrained adaptive filters. *IEEE Transactions on Signal Processing*, 47(10):2677-2684.

Hyvärinen, et al. 1997. A fast fixed-point algorithm for independent component analysis. *Neural Computation*, 9:1483-1492.

Hyvärinen, A. 1999. Fast and robust fixed-point algorithms for independent component analysis. *IEEE Trans. on Neural Networks*, 10(3):626-634.

Jutten, et al, 1991. Blind separation of sources, Part I: An adaptive algorithm based on neuromimetic architecture. *Signal Processing*, 24:1-10.

Lambert, R. H. 1996. Multichannel blind deconvolution: FIR matrix algebra and separation of multipath mixtures. Doctoral Dissertation, University of Southern California.

Lee, et al. 1997. A contextual blind separation of delayed and convolved sources. *Proceedings of the 1997 IEEE International Conference on Acoustics, Speech, and Signal Processing* (ICASSP '97), 2:1199-1202.

Lee, et al. 1998. Combining time-delayed decorreiation and ICA: Towards solving the cocktail party problem. *Proceedings of the 1998 IEEE International Conference on Acoustics, Speech, and Signal Processing* (ICASSP'98), 2:1249-1252.

Molgedey, et al. 1994. Separation of a mixture of independent signals using time delayed correlations. *Physical Review Letters, The American Physical Society*, 72(23):3634-3637.

Parra, et al. 2000. Convolutive blind separation of non-stationary sources. *IEEE Tmsactions on Speech and Audio Processing*, 8(3):320-327.

Platt, et al. 1992. Networks for the separation of sources that are superimposed and delayed. In J. Moody, S. Hanson, R. Lippmann (Eds.), *Advances in Neural Information Processing 4* (pp. 730-737). San Francisco: Morgan-Kaufmann.

Tong, et al. 1991. A necessary and sufficient condition for the blind identification of memoryless systems. *Circuits and Systems, IEEE International Symposium*, 1:1-4.

Torkkola, K. 1996. Blind separation of convolved sources based on information maximization. *Neural Networks for Signal Processing: VI. Proceedings of the 1996 IEEE Signal Processing Society Workshop*, pp. 423-432.

Torkkola, K. 1997. Blind deconvolution, information maximization and recursive filters. *IEEE International Conference on Acoustics, Speech, and Signal Processing* (*ICASSP'97*), 4:3301-3304.

Van Compernolle, et al. 1992. Signal separation in a symmetric adaptive noise canceler by output decorrelation. *Acoustics, Speech, and Signal Processing, 1992. ICASSP-92.*, 1992 IEEE International Conference, 4:221-224.

Visser, et al. Blind source separation in mobile environments using a priori knowledge. *Acoustics, Speech, and Signal Processing, 2004. Proceedings*. (*ICASSP '04*). IEEE International Conference on, vol. 3, May 17-21, 2004, pp. iii-893-896.

Visser, et al. Speech enhancement using blind source separation and two-channel energy based speaker detection. *Acoustics, Speech, and Signal Processing, 2003. Proceedings*. (*ICASSP '03*). 2003 IEEE International Conference on, vol. 1, Apr. 6-10, 2003, pp. I-884-I-887.

Yellin, et al. 1996. Multichannel signal separation: Methods and analysis. *IEEE Transactions on Signal Processing*, 44(1):106-118.

First Examination Report dated Oct. 23, 2006 from Indian Application No. 1571/CHENP/2005.

International Search Report from PCT/US03/39593 dated Apr. 29, 2004.

International Preliminary Report on Patentability dated Feb. 1, 2007, with Written Opinion of ISA dated Apr. 19, 2006, for PCT/US2005/026195 filed on Jul. 22, 2005.

International Preliminary Report on Patentability dated Feb. 1, 2007, with Written Opinion of ISA dated Mar. 10, 2006, for PCT/US2005/026196 filed on Jul. 22, 2005.

Office Action dated Oct. 31, 2006 from co-pending U.S. Appl. No. 10/537,985, filed Jun. 9, 2005.

Final Office Action dated Apr. 13, 2007 from co-pending U.S. Appl. No. 10/537,985, filed Jun. 9, 2005.

Notice of Allowance with Examiner's Amendment dated Jul. 30, 2007 from co-pending U.S. Appl. No. 10/537,985, filed Jun. 9, 2005.

Office Action dated Mar. 23, 2007 from co-pending U.S. Application No. 11/463,376, filed Aug. 9, 2006.

Office Action dated Jul. 23, 2007 from co-pending U.S. Application No. 11/187,504, filed Jul. 22, 2005.

International Search Report and Written Opinion of ISA dated Apr. 19, 2006 for PCT/US2005/26195 filed on Jul. 22, 2005.

* cited by examiner

HEADSET FOR SEPARATION OF SPEECH SIGNALS IN A NOISY ENVIRONMENT

RELATED APPLICATIONS

This application claims the benefit and priority to and is a U.S. National Phase of PCT International Application Number PCT/US2005/026195, filed on Jul. 22, 2005, which is a continuation-in-part of U.S. patent application Ser. No. 10/897,219 filed Jul. 22, 2004 (now U.S. Pat. No. 7,099,821 issued Aug. 29, 2006), which is related to co-pending PCT International Application Number PCT/US05/026196 and also related to PCT International Application Number PCT/US03/39593 filed on Dec. 11, 2003, which claims priority to U.S. Application Nos. 60/432,691 and 60/502,253. The disclosures of the above-described applications are hereby incorporated by reference in their entireties.

FIELD OF THE INVENTION

The present invention relates to an electronic communication device for separating a speech signal from a noisy acoustic environment. More particularly, one example of the present invention provides a wireless headset or earpiece for generating a speech signal.

BACKGROUND

An acoustic environment is often noisy, making it difficult to reliably detect and react to a desired informational signal. For example, a person may desire to communicate with another person using a voice communication channel. The channel may be provided, for example, by a mobile wireless handset, a walkie-talkie, a two-way radio, or other communication device. To improve usability, the person may use a headset or earpiece connected to the communication device. The headset or earpiece often has one or more ear speakers and a microphone. Typically, the microphone extends on a boom toward the person's mouth, to increase the likelihood that the microphone will pick up the sound of the person speaking. When the person speaks, the microphone receives the person's voice signal, and converts it to an electronic signal. The microphone also receives sound signals from various noise sources, and therefore also includes a noise component in the electronic signal. Since the headset may position the microphone several inches from the person's mouth, and the environment may have many uncontrollable noise sources, the resulting electronic signal may have a substantial noise component. Such substantial noise causes an unsatisfactory communication experience, and may cause the communication device to operate in an inefficient manner, thereby increasing battery drain.

In one particular example, a speech signal is generated in a noisy environment, and speech processing methods are used to separate the speech signal from the environmental noise. Such speech signal processing is important in many areas of everyday communication, since noise is almost always present in real-world conditions. Noise is defined as the combination of all signals interfering or degrading the speech signal of interest. The real world abounds from multiple noise sources, including single point noise sources, which often transgress into multiple sounds resulting in reverberation. Unless separated and isolated from background noise, it is difficult to make reliable and efficient use of the desired speech signal. Background noise may include numerous noise signals generated by the general environment, signals generated by background conversations of other people, as well as reflections and reverberation generated from each of the signals. In communication where users often talk in noisy environments, it is desirable to separate the user's speech signals from background noise. Speech communication mediums, such as cell phones, speakerphones, headsets, cordless telephones, teleconferences, CB radios, walkie-talkies, computer telephony applications, computer and automobile voice command applications and other hands-free applications, intercoms, microphone systems and so forth, can take advantage of speech signal processing to separate the desired speech signals from background noise.

Many methods have been created to separate desired sound signals from background noise signals, including simple filtering processes. Prior art noise filters identify signals with predetermined characteristics as white noise signals, and subtract such signals from the input signals. These methods, while simple and fast enough for real time processing of sound signals, are not easily adaptable to different sound environments, and can result in substantial degradation of the speech signal sought to be resolved. The predetermined assumptions of noise characteristics can be over-inclusive or under-inclusive. As a result, portions of a person's speech may be considered "noise" by these methods and therefore removed from the output speech signals, while portions of background noise such as music or conversation may be considered non-noise by these methods and therefore included in the output speech signals.

In signal processing applications, typically one or more input signals are acquired using a transducer sensor, such as a microphone. The signals provided by the sensors are mixtures of many sources. Generally, the signal sources as well as their mixture characteristics are unknown. Without knowledge of the signal sources other than the general statistical assumption of source independence, this signal processing problem is known in the art as the "blind source separation (BSS) problem". The blind separation problem is encountered in many familiar forms. For instance, it is well known that a human can focus attention on a single source of sound even in an environment that contains many such sources, a phenomenon commonly referred to as the "cocktail-party effect." Each of the source signals is delayed and attenuated in some time varying manner during transmission from source to microphone, where it is then mixed with other independently delayed and attenuated source signals, including multipath versions of itself (reverberation), which are delayed versions arriving from different directions. A person receiving all these acoustic signals may be able to listen to a particular set of sound source while filtering out or ignoring other interfering sources, including multi-path signals.

Considerable effort has been devoted in the prior art to solve the cocktail-party effect, both in physical devices and in computational simulations of such devices. Various noise mitigation techniques are currently employed, ranging from simple elimination of a signal prior to analysis to schemes for adaptive estimation of the noise spectrum that depend on a correct discrimination between speech and non-speech signals. A description of these techniques is generally characterized in U.S. Pat. No. 6,002,776 (herein incorporated by reference). In particular, U.S. Pat. No. 6,002,776 describes a scheme to separate source signals where two or more microphones are mounted in an environment that contains an equal or lesser number of distinct sound sources. Using direction-of-arrival information, a first module attempts to extract the original source signals while any residual crosstalk between the channels is removed by a second module. Such an arrangement may be effective in separating spatially localized point sources with clearly defined direction-of-arrival but fails to separate out a speech signal in a real-world spatially distributed noise environment for which no particular direction-of-arrival can be determined.

Methods, such as Independent Component Analysis ("ICA"), provide relatively accurate and flexible means for the separation of speech signals from noise sources. ICA is a technique for separating mixed source signals (components) which are presumably independent from each other. In its simplified form, independent component analysis operates an "un-mixing" matrix of weights on the mixed signals, for example multiplying the matrix with the mixed signals, to produce separated signals. The weights are assigned initial values, and then adjusted to maximize joint entropy of the signals in order to minimize information redundancy. This weight-adjusting and entropy-increasing process is repeated until the information redundancy of the signals is reduced to a minimum. Because this technique does not require information on the source of each signal, it is known as a "blind source separation" method. Blind separation problems refer to the idea of separating mixed signals that come from multiple independent sources.

Many popular ICA algorithms have been developed to optimize their performance, including a number which have evolved by significant modifications of those which only existed a decade ago. For example, the work described in A. J. Bell and T J Sejnowski, Neural Computation 7:1129-1159 (1995), and Bell, A. J. U.S. Pat. No. 5,706,402, is usually not used in its patented form. Instead, in order to optimize its performance, this algorithm has gone through several recharacterizations by a number of different entities. One such change includes the use of the "natural gradient", described in Amari, Cichocki, Yang (1996). Other popular ICA algorithms include methods that compute higher-order statistics such as cumulants (Cardoso, 1992; Comon, 1994; Hyvaerinen and Oja, 1997).

However, many known ICA algorithms are not able to effectively separate signals that have been recorded in a real environment which inherently include acoustic echoes, such as those due to room architecture related reflections. It is emphasized that the methods mentioned so far are restricted to the separation of signals resulting from a linear stationary mixture of source signals. The phenomenon resulting from the summing of direct path signals and their echoic counterparts is termed reverberation and poses a major issue in artificial speech enhancement and recognition systems. ICA algorithms may require long filters which can separate those time-delayed and echoed signals, thus precluding effective real time use.

Known ICA signal separation systems typically use a network of filters, acting as a neural network, to resolve individual signals from any number of mixed signals input into the filter network. That is, the ICA network is used to separate a set of sound signals into a more ordered set of signals, where each signal represents a particular sound source. For example, if an ICA network receives a sound signal comprising piano music and a person speaking, a two port ICA network will separate the sound into two signals: one signal having mostly piano music, and another signal having mostly speech.

Another prior technique is to separate sound based on auditory scene analysis. In this analysis, vigorous use is made of assumptions regarding the nature of the sources present. It is assumed that a sound can be decomposed into small elements such as tones and bursts, which in turn can be grouped according to attributes such as harmonicity and continuity in time. Auditory scene analysis can be performed using information from a single microphone or from several microphones. The field of auditory scene analysis has gained more attention due to the availability of computational machine learning approaches leading to computational auditory scene analysis or CASA. Although interesting scientifically since it involves the understanding of the human auditory processing, the model assumptions and the computational techniques are still in its infancy to solve a realistic cocktail party scenario.

Other techniques for separating sounds operate by exploiting the spatial separation of their sources. Devices based on this principle vary in complexity. The simplest such devices are microphones that have highly selective, but fixed patterns of sensitivity. A directional microphone, for example, is designed to have maximum sensitivity to sounds emanating from a particular direction, and can therefore be used to enhance one audio source relative to others. Similarly, a close-talking microphone mounted near a speaker's mouth may reject some distant sources. Microphone-array processing techniques are then used to separate sources by exploiting perceived spatial separation. These techniques are not practical because sufficient suppression of a competing sound source cannot be achieved due to their assumption that at least one microphone contains only the desired signal, which is not practical in an acoustic environment.

A widely known technique for linear microphone-array processing is often referred to as "beamforming". In this method the time difference between signals due to spatial difference of microphones is used to enhance the signal. More particularly, it is likely that one of the microphones will "look" more directly at the speech source, whereas the other microphone may generate a signal that is relatively attenuated. Although some attenuation can be achieved, the beamformer cannot provide relative attenuation of frequency components whose wavelengths are larger than the array. These techniques are methods for spatial filtering to steer a beam towards a sound source and therefore putting a null at the other directions. Beamforming techniques make no assumption on the sound source but assume that the geometry between source and sensors or the sound signal itself is known for the purpose of dereverberating the signal or localizing the sound source.

A known technique in robust adaptive beamforming referred to as "Generalized Sidelobe Canceling" (GSC) is discussed in Hoshuyama, O., Sugiyama, A., Hirano, A., *A Robust Adaptive Beamformer for Microphone Arrays with a Blocking Matrix using Constrained Adaptive Filters*, IEEE Transactions on Signal Processing, vol 47, No 10, pp 2677-2684, October 1999. GSC aims at filtering out a single desired source signal z_i from a set of measurements x, as more fully explained in The GSC principle, Griffiths, L. J., Jim, C. W., *An alternative approach to linear constrained adaptive beamforming*, IEEE Transaction Antennas and Propagation, vol 30, no 1, pp. 27-34, January 1982. Generally, GSC predefines that a signal-independent beamformer c filters the sensor signals so that the direct path from the desired source remains undistorted whereas, ideally, other directions should be suppressed. Most often, the position of the desired source must be pre-determined by additional localization methods. In the lower, side path, an adaptive blocking matrix B aims at suppressing all components originating from the desired signal z_i so that only noise components appear at the output of B. From these, an adaptive interference canceller a derives an estimate for the remaining noise component in the output of c, by minimizing an estimate of the total output power E(z_i*z_i). Thus the fixed beamformer c and the interference canceller a jointly perform interference suppression. Since GSC requires the desired speaker to be confined to a limited tracking region, its applicability is limited to spatially rigid scenarios.

Another known technique is a class of active-cancellation algorithms, which is related to sound separation. However, this technique requires a "reference signal," i.e., a signal derived from only of one of the sources. Active noise-cancellation and echo cancellation techniques make extensive use of thus technique and the noise reduction is relative to the contribution of noise to a mixture by filtering a known signal that contains only the noise, and subtracting it from the mixture. This method assumes that one of the measured signals consists of one and only one source, an assumption which is not realistic in many real life settings.

Techniques for active cancellation that do not require a reference signal are called "blind" and are of primary interest in this application. They are now classified, based on the degree of realism of the underlying assumptions regarding the acoustic processes by which the unwanted signals reach the microphones. One class of blind active-cancellation techniques may be called "gain-based" or also known as "instantaneous mixing": it is presumed that the waveform produced by each source is received by the microphones simultaneously, but with varying relative gains. (Directional microphones are most often used to produce the required differences in gain.) Thus, a gain-based system attempts to cancel copies of an undesired source in different microphone signals by applying relative gains to the microphone signals and subtracting, but not applying time delays or other filtering. Numerous gain-based methods for blind active cancellation have been proposed; see Herault and Jutten (1986), Tong et al. (1991), and Molgedey and Schuster (1994). The gain-based or instantaneous mixing assumption is violated when microphones are separated in space as in most acoustic applications. A simple extension of this method is to include a time delay factor but without any other filtering, which will work under anechoic conditions. However, this simple model of acoustic propagation from the sources to the microphones is of limited use when echoes and reverberation are present. The most realistic active-cancellation techniques currently known are "convolutive": the effect of acoustic propagation from each source to each microphone is modeled as a convolutive filter. These techniques are more realistic than gain-based and delay-based techniques because they explicitly accommodate the effects of inter-microphone separation, echoes and reverberation. They are also more general since, in principle, gains and delays are special cases of convolutive filtering.

Convolutive blind cancellation techniques have been described by many researchers including Jutten et al. (1992), by Van Compernolle and Van Gerven (1992), by Platt and Faggin (1992), Bell and Sejnowski (1995), Torkkola (1996), Lee (1998) and by Parra et al. (2000). The mathematical model predominantly used in the case of multiple channel observations through an array of microphones, the multiple source models can be formulated as follows:

$$x_i(t) = \sum_{l=0}^{L} \sum_{j=1}^{m} a_{ijl}(t) s_j(t-l) + n_i(t)$$

where the x(t) denotes the observed data, s(t) is the hidden source signal, n(t) is the additive sensory noise signal and a(t) is the mixing filter. The parameter m is the number of sources, L is the convolution order and depends on the environment acoustics and t indicates the time index. The first summation is due to filtering of the sources in the environment and the second summation is due to the mixing of the different sources. Most of the work on ICA has been centered on algorithms for instantaneous mixing scenarios in which the first summation is removed and the task is to simplified to inverting a mixing matrix a. A slight modification is when assuming no reverberation, signals originating from point sources can be viewed as identical when recorded at different microphone locations except for an amplitude factor and a delay. The problem as described in the above equation is known as the multichannel blind deconvolution problem. Representative work in adaptive signal processing includes Yellin and Weinstein (1996) where higher order statistical information is used to approximate the mutual information among sensory input signals. Extensions of ICA and BSS work to convolutive mixtures include Lambert (1996), Torkkola (1997), Lee et al. (1997) and Parra et al. (2000).

ICA and BSS based algorithms for solving the multichannel blind deconvolution problem have become increasing popular due to their potential to solve the separation of acoustically mixed sources. However, there are still strong assumptions made in those algorithms that limit their applicability to realistic scenarios. One of the most incompatible assumption is the requirement of having at least as many sensors as sources to be separated. Mathematically, this assumption makes sense. However, practically speaking, the number of sources is typically changing dynamically and the sensor number needs to be fixed. In addition, having a large number of sensors is not practical in many applications. In most algorithms a statistical source signal model is adapted to ensure proper density estimation and therefore separation of a wide variety of source signals. This requirement is computationally burdensome since the adaptation of the source model needs to be done online in addition to the adaptation of the filters. Assuming statistical independence among sources is a fairly realistic assumption but the computation of mutual information is intensive and difficult. Good approximations are required for practical systems. Furthermore, no sensor noise is usually taken into account which is a valid assumption when high end microphones are used. However, simple microphones exhibit sensor noise that has to be taken care of in order for the algorithms to achieve reasonable performance. Finally most ICA formulations implicitly assume that the underlying source signals essentially originate from spatially localized point sources albeit with their respective echoes and reflections. This assumption is usually not valid for strongly diffuse or spatially distributed noise sources like wind noise emanating from many directions at comparable sound pressure levels. For these types of distributed noise scenarios, the separation achievable with ICA approaches alone is insufficient.

What is desired is a simplified speech processing method that can separate speech signals from background noise in near real-time and that does not require substantial computing power, but still produces relatively accurate results and can adapt flexibly to different environments.

SUMMARY OF THE INVENTION

Briefly, the present invention provides a headset constructed to generate an acoustically distinct speech signal in a noisy acoustic environment. The headset positions a multitude of spaced-apart microphones near a user's mouth. The microphones each receive the user's speech, and also receive acoustic environmental noise. The microphone signals, which have both a noise and information component, are received into a separation process. The separation process generates a speech signal that has a substantial reduced noise component. The speech signal is then processed for transmission. In one example, the transmission process includes sending the speech signal to a local control module using a Bluetooth radio.

In a more specific example, the headset is an earpiece that is wearable on an ear. The earpiece has a housing that holds a processor and a Bluetooth radio, and supports a boom. A first microphone is positioned at the end of the boom, and a second microphone is positioned in a spaced-apart arrangement on the housing. Each microphone generates an electrical signal, both of which have a noise and information component. The microphone signals are received into the processor, where they are processed using a separation process. The separation process may be, for example, a blind signal source separation or an independent component analysis process. The separation process generates a speech signal that has a substantial reduced noise component, and may also generate a signal indicative of the noise component, which may be used to further post-process the speech signal. The speech signal is then processed for transmission by the Bluetooth radio. The earpiece may also include a voice activity detector that generates a control signal when speech is likely occurring. This control signal enables processes to be activated, adjusted, or controlled according to when speech is occurring, thereby enabling more efficient and effective operations. For example, the independent component analysis process may be stopped when the control signal is off and no speech is present.

Advantageously, the present headset generates a high quality speech signal. Further, the separation process is enabled to operate in a stable and predictable manner, thereby increasing overall effectiveness and efficiency. The headset construction is adaptable to a wide variety of devices, processes, and application. Other aspects and embodiments are illustrated in drawings, described below in the "Detailed Description" section, or defined by the scope of the claims.

DETAILED DESCRIPTION OF THE PREFERRED EMBODIMENT

Figure 1:
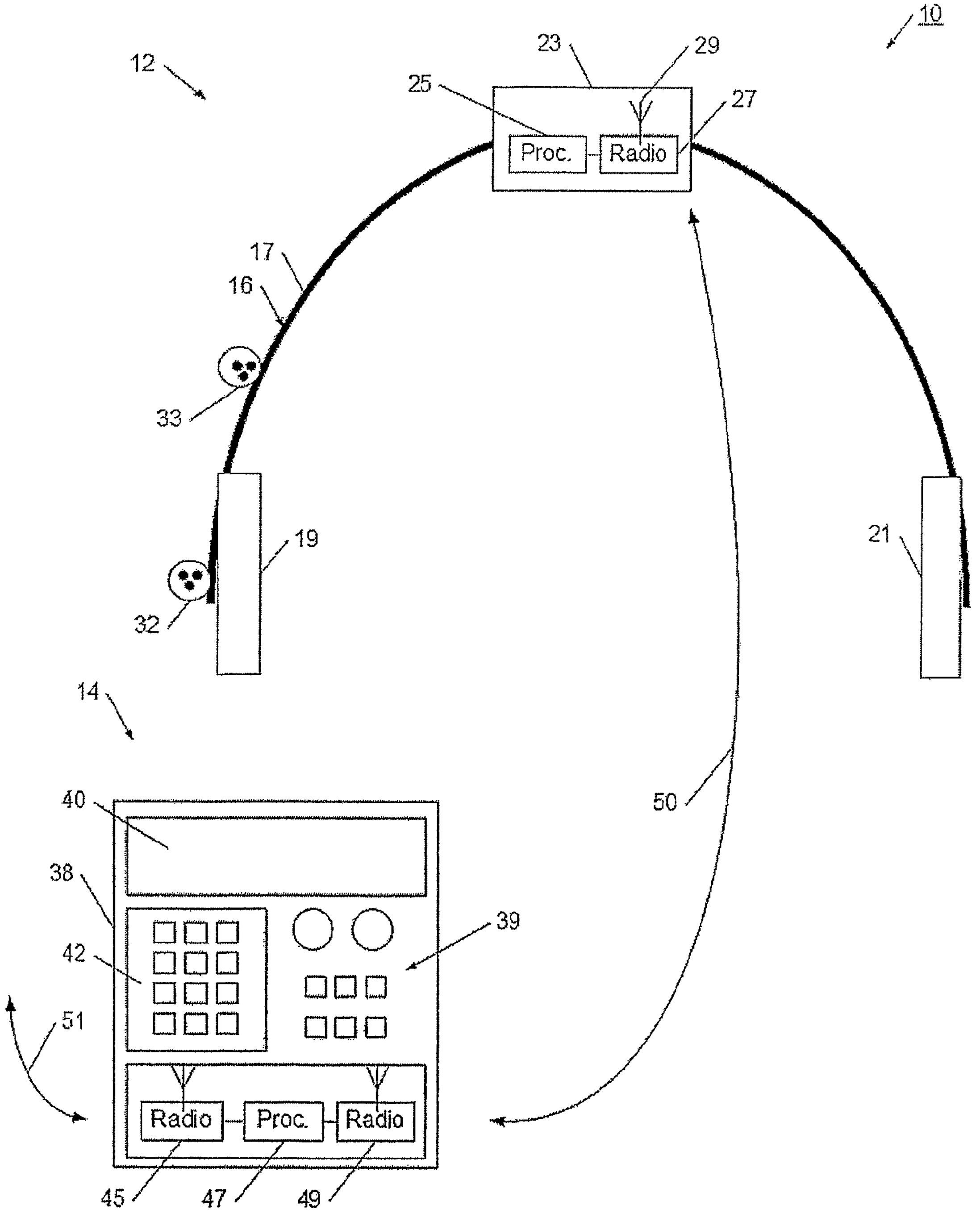
FIG. 1 is a diagram of a wireless headset in accordance with the present invention.

Referring now to FIG. 1, wireless headset system 10 is illustrated. Wireless headset system 10 has headset 12 which wirelessly communicates with control module 14. Headset 12 is constructed to be worn or otherwise attached to a user. Headset 12 has housing 16 in the form of a headband 17. Although headset 12 is illustrated as a stereo headset, it will be appreciated that headset 12 may take alternative forms. Headband 17 has an electronic housing 23 for holding required electronic systems. For example, electronic housing 23 may include a processor 25 and a radio 27. The radio 27 may have various sub modules such as antenna 29 for enabling communication with control module 14. Electronic housing 23 typically holds a portable energy source such as batteries or rechargeable batteries (not shown). Although headset systems are described in the context of the preferred embodiment, those skilled in the art will appreciate that the techniques described for separating a speech signal from a noisy acoustic environment are likewise suitable for various electronic communication devices which are utilized in noisy environments or multi-noise environments. Accordingly, the described exemplary embodiment for wireless headset system for voice applications is by way of example only and not by way of limitation.

Circuitry within the electronic housing is coupled to a set of stereo ear speakers. For example, the headset 12 has ear speaker 19 and ear speaker 21 arranged to provide stereophonic sound for the user. More particularly, each ear speaker is arranged to rest against an ear of the user. Headset 12 also has a pair of transducers in the form of audio microphones 32 and 33. As illustrated in FIG. 1, microphone 32 is positioned adjacent ear speaker 19, while microphone 33 is positioned above ear speaker 19. In this way, when a user is wearing headset 12, each microphone has a different audio path to the speaker's mouth, and microphone 32 is always closer to the speaker's mouth. Accordingly, each microphone receives the user's speech, as well as a version of ambient acoustic noise. Since the microphones are spaced apart, each microphone will receive a slightly different ambient noise signal, as well as a somewhat different version of the speaker's speech. These small differences in audio signal enable enhanced speech separation in processor 25. Also, since microphone 32 is closer to the speaker's mouth than microphone 33, the signal from microphone 32 will always receive the desired speech signal first. This known ordering of the speech signal enables a simplified and more efficient signal separation process.

Although microphones 32 and 33 are shown positioned adjacent to an ear speaker, it will be appreciated that many other positions may be useful. For example, one or both microphones may be extended on a boom. Alternatively, the microphones may be positioned on different sides of the user's head, in differing directions, or in a spaced apart arrangement such as an array. Depending on specific applications and physical constraints, it will also be understood that the microphones may face forward or to the side, may be omni directional or directional, or have such other locality or physical constraint such that at least two microphones each will receive differing proportions of noise and speech.

Processor 25 receives the electronic microphone signal from microphone 32 and also receives the raw microphone signal from microphone 33. It will be appreciated that that signals may be digitized, filtered, or otherwise pre-processed. The processor 25 operates a signal separation process for separating speech from acoustic noise. In one example, the signal separation process is a blind signal separation process. In a more specific example, the signal separation process is an independent component analysis process. Since microphone 32 is closer to the speaker's mouth than microphone 33, the signal from microphone 32 will always receive the desired speech signal first and it will be louder in microphone 32 recorded channel than in microphone 33 recorded channel, which aids in identifying the speech signal. The output from the signal separation process is a clean speech signal, which is processed and prepared for transmission by radio 27. Although the clean speech signal has had a substantial portion of the noise removed, it is likely that some noise component may still be on the signal. Radio 27 transmits the modulated speech signal to control module 14. In one example, radio 27 complies with the Bluetooth® communication standard. Bluetooth is a well-known personal area network communication standard which enables electronic devices to communicate over short distances, usually less than 30 feet. Bluetooth also enables communication at a rate sufficient to support audio level transmissions. In another example, radio 27 may operate according to the IEEE 802.11 standard, or other such wireless communication standard (as employed herein, the term radio refers to such wireless communication standards). In another example, radio 27 may operate according to a proprietary commercial or military standard for enabling specific and secure communications.

Control module 14 also has a radio 49 configured to communicate with radio 27. Accordingly, radio 49 operates according to the same standard and on the same channel configuration as radio 27. Radio 49 receives the modulated speech signal from radio 27 and uses processor 47 to perform any required manipulation of the incoming signal. Control module 14 is illustrated as a wireless mobile device 38. Wireless mobile device 38 includes a graphical display 40, input keypad 42, and other user controls 39. Wireless mobile device 38 operates according to a wireless communication standard, such as CDMA, WCDMA, CDMA2000, GSM, EDGE, UMTS, PHS, PCM or other communication standard. Accordingly, radio 45 is constructed to operate in compliance with the required communication standard, and facilitates communication with a wireless infrastructure system. In this way, control module 14 has a remote communication link 51 to a wireless carrier infrastructure, and also has a local wireless link 50 to headset 12.

In operation, the wireless headset system 10 operates as a wireless mobile device for placing and receiving voice communications. For example, a user may use control module 14 for dialing a wireless telephone call. The processor 47 and radio 45 cooperate to establish a remote communication link 51 with a wireless carrier infrastructure. Once a voice channel has been established with the wireless infrastructure, the user may use headset 12 for carrying on a voice communication. As the user speaks, the speaker's voice, as well as ambient noise, is received by microphone 32 and by microphone 33. The microphone signals are received at processor 25. Processor 25 uses a signal separation process to generate a clean speech signal. The clean speech signal is transmitted by radio 27 to control module 14, for example, using the Bluetooth standard. The received speech signal is then processed and modulated for communication using radio 45. Radio 45 communicates the speech signal through communication 51 to the wireless infrastructure. In this way, the clean speech signal is communicated to a remote listener. Speech signals coming from remote listener are sent through the wireless infrastructure, through communication 51, and to radio 45. The processor 47 and radio 49 convert and format the received signal into the local radio format, such as Bluetooth, and communicates the incoming signal to radio 27. The incoming signal is then sent to ear speakers 19 and 21, so the local user may hear the remote user's speech. In this way, a full duplex voice communication system is enabled.

The microphone arrangement is such that the delay of the desired speech signal from one microphone to the other is sufficiently large and/or the desired voice content between two recorded input channels are sufficiently different to be able to separate the desired speaker's voice, e.g., pick up of the speech is more optimal in the primary microphone. This includes modulation of the voice plus noise mixtures through the use of directional microphones or non linear arrangements of omni directional microphones. Specific placement of the microphones should also be considered and adjusted according to expected environment characteristics, such as expected acoustic noise, probable wind noise, biomechanical design considerations and acoustic echo from the loudspeaker. One microphone configuration may address acoustic noise scenarios and acoustic echo well. However these acoustic/echo noise cancellation tasks usually require the secondary microphone (the sound centric microphone or the microphone responsible for recording the sound mixture containing substantial noise) to be turned away from the direction that the primary microphone is oriented towards. As used here, the primary microphone is the microphone closest the target speaker. The optimal microphone arrangement may be a compromise between directivity or locality (nonlinear microphone configuration, microphone characteristic directivity pattern) and acoustic shielding of the microphone membrane against wind turbulence.

In mobile applications like the cellphone handset and headset, robustness towards desired speaker movements is achieved by fine tuning the directivity pattern of the separating ICA filters through adaptation and choosing a microphone configuration which leads to the same voice/noise channel output order for a range of most likely device/speaker mouth arrangements. Therefore the microphones are preferred to be arranged on the divide line of a mobile device, not symmetrically on each side of the hardware. In this way, when the mobile device is being used, the same microphone is always positioned to most effectively receive the most speech, regardless of the position of the invention device, e.g., the primary microphone is positioned in such a way as to be closest to the speaker's mouth regardless of user positioning of the device. This consistent and predefined positioning enables the ICA process to have better default values, and to more easily identify the speech signal.

The use of directional microphones is preferred when dealing with acoustic noise since they typically yield better initial SNR. However directional microphones are more sensitive to wind noise and have higher internal noise (low frequency electronic noise pick up). The microphone arrangement can be adapted to work with both omnidirectional and directional microphones but the acoustic noise removal needs to be traded off against the wind noise removal.

Wind noise is typically caused by a extended force of air being applied directly to a microphone's transducer membrane. The highly sensitive membrane generates a large, and sometimes saturated, electronic signal. The signal overwhelms and often decimates any useful information in the microphone signal, including any speech content. Further, since the wind noise is so strong, it may cause saturation and stability problems in the signal separation process, as well as in post processing steps. Also, any wind noise that is transmitted causes an unpleasant and uncomfortable listening experience to the listener. Unfortunately, wind noise has been a particularly difficult problem with headset and earpiece devices.

However, the two-microphone arrangement of the wireless headset enables a more robust way to detect wind, and a microphone arrangement or design that minimizes the disturbing effects of wind noise. Since the wireless headset has two microphones, the headset may operate a process that more accurately identifies the presence of wind noise. As described above the two microphones may be arranged so that their input ports face different directions, or are shielded to each receive wind from a different direction. In such an arrangement, a burst of wind will cause a dramatic energy level increase in the microphone facing the wind, while the other microphone will only be minimally affected. Thus, when the headset detects a large energy spike on only one microphone, the headset may determine that that microphone is being subjected to wind. Further, other processes may be applied to the microphone signal to further confirm that the spike is due to wind noise. For example, wind noise typically has a low-frequency pattern, and when such a pattern is found on one or both channels, the presence of wind noise may be indicated. Alternatively, specific mechanical or engineering designs can be considered for wind noise.

Once the headset has found that one of the microphones is being hit with wind, the headset may operate a process to minimize the wind's effect. For example, the process may block the signal from the microphone that is subjected to wind, and process only the other microphone's signal. In this case, the separation process is also deactivated, and the noise reduction processes operated as a more traditional single microphone system. Once the microphone is no longer being hit by the wind, the headset may return to normal two channel operation. In some microphone arrangements, the microphone that is farther from the speaker receives such a limited level of speech signal that it is not able to operate as a sole microphone input. In such a case, the microphone closest to the speaker can not be deactivated or de-emphasized, even when it is being subjected to wind.

Thus, by arranging the microphones to face a different wind direction, a windy condition may cause substantial noise in only one of the microphones. Since the other microphone may be largely unaffected, it may be solely used to provide a high quality speech signal to the headset while the other microphone is under attack from the wind. Using this process, the wireless headset may advantageous be used in windy environments. In another example, the headset has a mechanical knob on the outside of the headset so the user can switch from a dual channel mode to a single channel mode. If the individual microphones are directional, then even single microphone operation may still be too sensitive to wind noise. However when the individual microphones are omnidirectional, the wind noise artifacts should be somewhat alleviated, although the acoustical noise suppression will deteriorate. There is an inherent trade-off in signal quality when dealing with wind noise and acoustic noise simultaneously. Some of this balancing can be accommodated by the software, while some decisions can be made responsive to user preferences, for example, by having a user select between single or dual channel operation. In some arrangements, the user may also be able to select which of the microphones to use as the single channel input.

Figure 2:
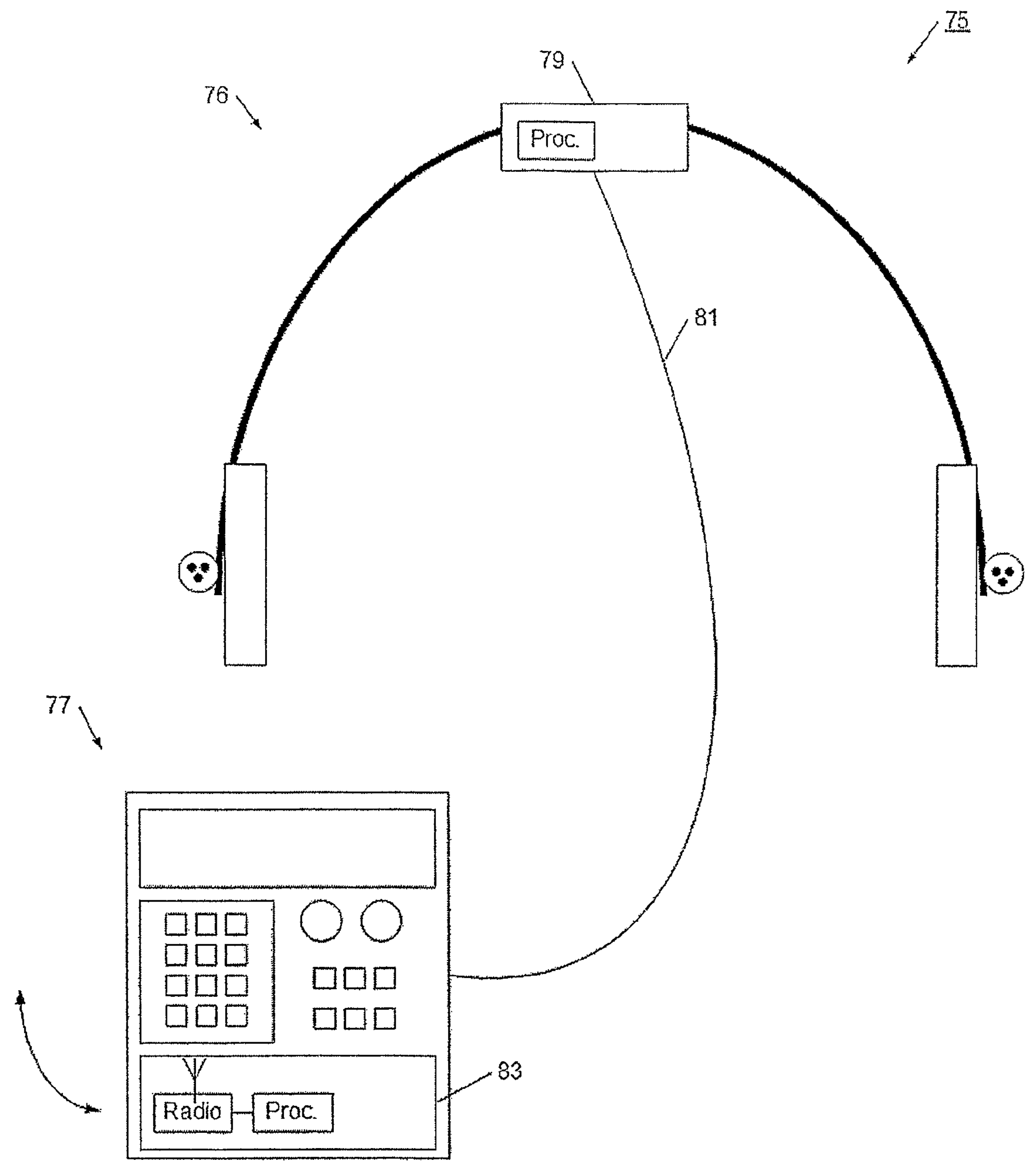
FIG. 2 is a diagram of a headset in accordance with the present invention.

Referring now to FIG. 2, a wired headset system 75 is illustrated. Wired headset system 75 is similar to wireless headset system 10 described earlier so this system 75 will not be described in detail. Wireless headset system 75 has a headset 76 having a set of stereo ear speakers and two microphones as described with reference to FIG. 1. In headset system 75, each microphone is positioned adjacent a respective earpiece. In this way, each microphone is positioned about the same distance to the speaker's mouth. Accordingly, the separation process may use a more sophisticated method for identifying the speech signal and more sophisticated BSS algorithms. For example, the buffer sizes may need to be increased, and additional processing power applied to more accurately measure the degree of separation between the channels. Headset 76 also has an electronic housing 79 which holds a processor. However, electronic housing 79 has a cable 81 which connects to control module 77. Accordingly, communication from headset 76 to control module 77 is through wire 81. In this regard, module electronics 83 does not need a radio for local communication. Module electronics 83 has a processor and radio for establishing communication with a wireless infrastructure system.

Figure 3:
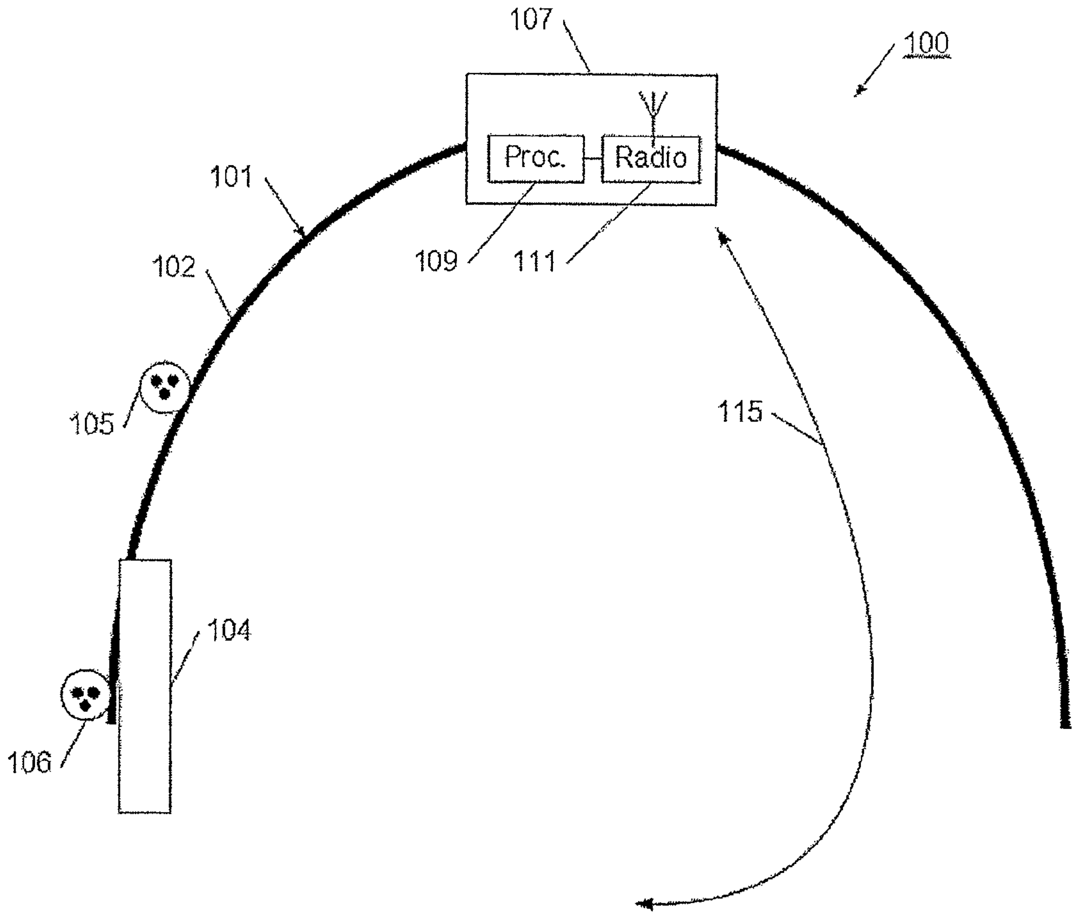
FIG. 3 is a diagram of a wireless headset in accordance with the present invention.

Referring now to FIG. 3, wireless headset system 100 is illustrated. Wireless headset system 100 is similar to wireless headset system 10 described earlier, so will not be described in detail. Wireless headset system 100 has a housing 101 in the form of a headband 102. Headband 102 holds an electronic housing 107 which has a processor 109 and local radio 111. The local radio 111 may be, for example, a Bluetooth radio. Radio 111 is configured to communicate with a control module in the local area. For example, if radio 111 operates according to an IEEE 802.11 standard, then its associated control module should generally be within about 100 feet of the radio 111. It will be appreciated that the control module may be a wireless mobile device, or may be constructed for a more local use.

In a specific example, headset 100 is used as a headset for commercial or industrial applications such as at a fast food restaurant. The control module may be centrally positioned in the restaurant, and enable employees to communicate with each other or customers anywhere in the immediate restaurant area. In another example, radio 111 is constructed for wider area communications. In one example, radio 111 is a commercial radio capable of communicating over several miles. Such a configuration would allow a group of emergency first-responders to maintain communication while in a particular geographic area, without having to rely on the availability of any particular infrastructure. Continuing this example, the housing 102 may be part of a helmet or other emergency protective gear. In another example, the radio 111 is constructed to operate on military channels, and the housing 102 is integrally formed in a military element or headset. Wireless headset 100 has a single mono ear speaker 104. A first microphone 106 is positioned adjacent the ear speaker 104, while a second microphone 105 is positioned above the earpiece. In this way, the microphones are spaced apart, yet enable an audio path to the speaker's mouth. Further, microphone 106 will always be closer to the speaker's mouth, enabling a simplified identification of the speech source. It will be appreciated that the microphones may be alternatively placed. In one example, one or both microphones may be placed on a boom.

Figure 4:
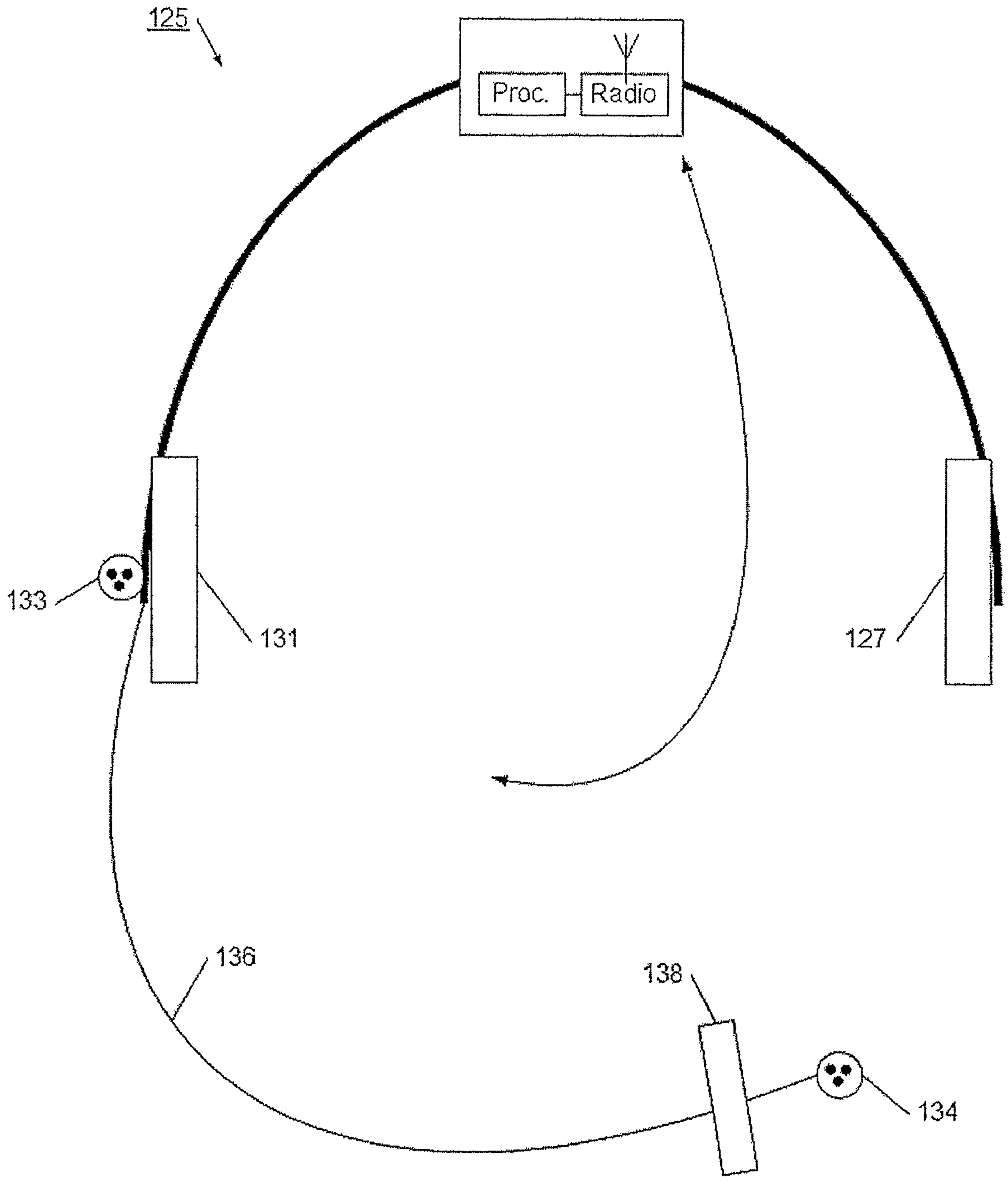
FIG. 4 is a diagram of a wireless headset in accordance with the present invention.

Referring now to FIG. 4, wireless headset system 125 is illustrated. Wireless headset system 125 is similar to wireless headset system 10 described earlier, so will not be described in detail. Wireless headset system 125 has a headset housing having a set of stereo speakers 131 and 127. A first microphone 133 is attached to the headset housing. A second microphone 134 is in a second housing at the end of a wire 136. Wire 136 attaches to the headset housing and electronically couples with the processor. Wire 136 may contain a clip 138 for securing the second housing and microphone 134 to a relatively consistent position. In this way, microphone 133 is positioned adjacent one of the user's ears, while second microphone 134 may be clipped to the user's clothing, for example, in the middle of the chest. This microphone arrangement enables the microphones to be spaced quite far apart, while still allowing a communication path from the speaker's mouth to each microphone. In a preferred use, the second microphone is always placed farther away from the speaker's mouth than the first microphone 133, enabling a simplified signal identification process. However, a user may inadvertently place microphone too close to the mouth, resulting in microphone 133 being farther away. Accordingly, the separation process for headset 125 may require additional sophistication and processes for accounting for the ambiguous placement arrangement of the microphones as well as more powerful BSS algorithms.

Figure 5:
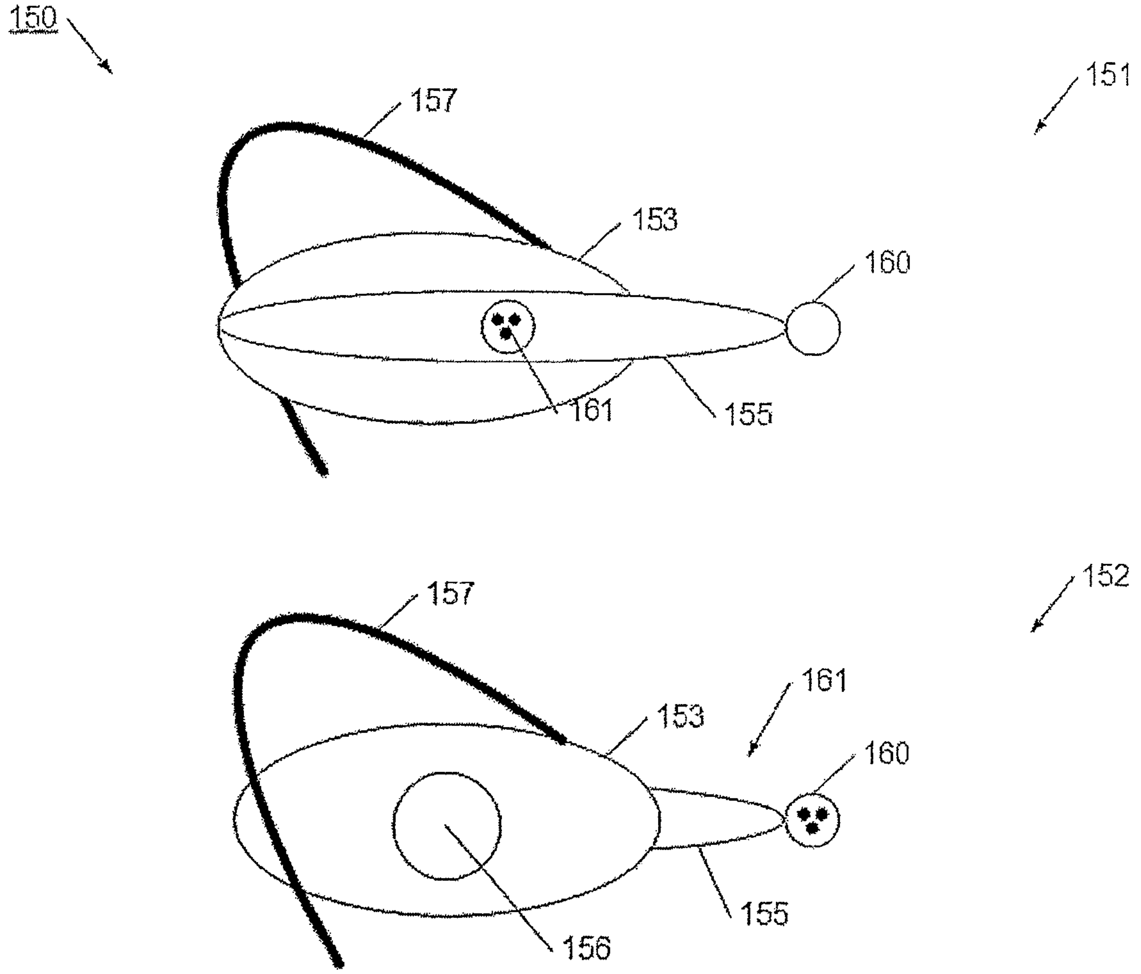
FIG. 5 is a is a diagram of a wireless earpiece in accordance with the present invention.

Referring now to FIG. 5, a wireless headset system 150 is illustrated. Wireless headset system 150 is constructed as an earpiece with an integrated boom microphone. Wireless headset system 150 is illustrated in FIG. 5 from a left-hand side 151 and from a right hand side 152. Wireless headset system 150 has an ear clip 157 which attaches to or around a user's ear. A housing 153 holds a speaker 156. When in use, the ear clip number 157 holds the housing 153 against one of the user's ears, thereby placing speaker 156 adjacent to the user's ear. The housing also has a microphone boom 155. The microphone boom may be made of various lengths, but typically is in the range of 1 to 4 inches. A first microphone 160 is positioned at the end of microphone boom 155. The first microphone 160 is constructed to have a relatively direct path to the mouth of the speaker. A second microphone 161 is also positioned on the housing 153. The second microphone 161 may be positioned on the microphone boom 155 at a position that is spaced apart from the first microphone 160. In one example, the second microphone 161 is positioned to have a less direct path to the speaker's mouth. However, it will be appreciated that if the boom 155 is long enough, both microphones may be placed on the same side of the boom to have relatively direct paths to the speaker's mouth. However, as illustrated, the second microphone 161 is positioned on the outside of the boom 155, as the inside of the boom is likely in contact with the user's face. It will also be appreciated that the microphone 161 may be positioned further back on the boom, or on the main part of the housing.

The housing 153 also holds a processor, radio, and power supply. The power supply is typically in the form of rechargeable batteries, while the radio may be compliant with a standard, such as the Bluetooth standard. If the wireless headset system 150 is compliant with the Bluetooth standard, then the wireless headset 150 communicates with a local Bluetooth control module. For example, the local control module may be a wireless mobile device constructed to operate on a wireless communication infrastructure. This enables the relatively large and sophisticated electronics needed to support wide area wireless communications in the control module, which may be worn on a belt or carried in a briefcase, while enabling only the more compact local Bluetooth radio to be held in the housing 153. It will be appreciated, however, that as technology advances that the wide area radio may be also incorporated in housing 153. In this way, a user would communicate and control using voice activated commands and instructions.

In one specific example, the housing for Bluetooth headset is roughly 6 cm by 3 cm by 1.5 cm. First microphone 160 is a noise canceling directional microphone, with the noise canceling port facing 180 degrees away from the mic pickup port. The second microphone is also a directional noise canceling microphone, with its pickup port positioned orthogonally to the pickup port of first microphone 160. The microphones are positioned 3-4 cm apart. The microphones should not be positioned too close to each other to enable separation of low frequency components and not too far apart to avoid spatial aliasing in the higher frequency bands. In an alternative arrangement, the microphones are both directional microphones, but the noise canceling ports are facing 90 degrees away from the mic pickup port. In this arrangement, a somewhat greater spacing may be desirable, for example, 4 cm. If omni directional microphones are used, the spacing may desirably be increased to about 6 cm, and the noise canceling port facing 180 degrees away from the mic pickup port. Omni-directional mics may be used when the microphone arrangement allows for a sufficiently different signal mixture in each microphone. The pickup pattern of the microphone can be omni-directional, directional, cardioid, figure-eight, or far-field noise canceling. It will be appreciated that other arrangements may be selected to support particular applications and physical limitations.

The wireless headset 150 of FIG. 5 has a well defined relationship between microphone position and the speaker's mouth. In such a rigid and predefined physical arrangement, the wireless headset my use the Generalized Sidelobe Canceller to filter out noise, thereby exposing a relatively clean speech signal. In this way, the wireless headset will not operate a signal separation process, but will set the filter coefficients in the Generalized Sidelobe Canceller according to the defined position for the speaker, and for the defined area where noise will come from.

Figure 6:
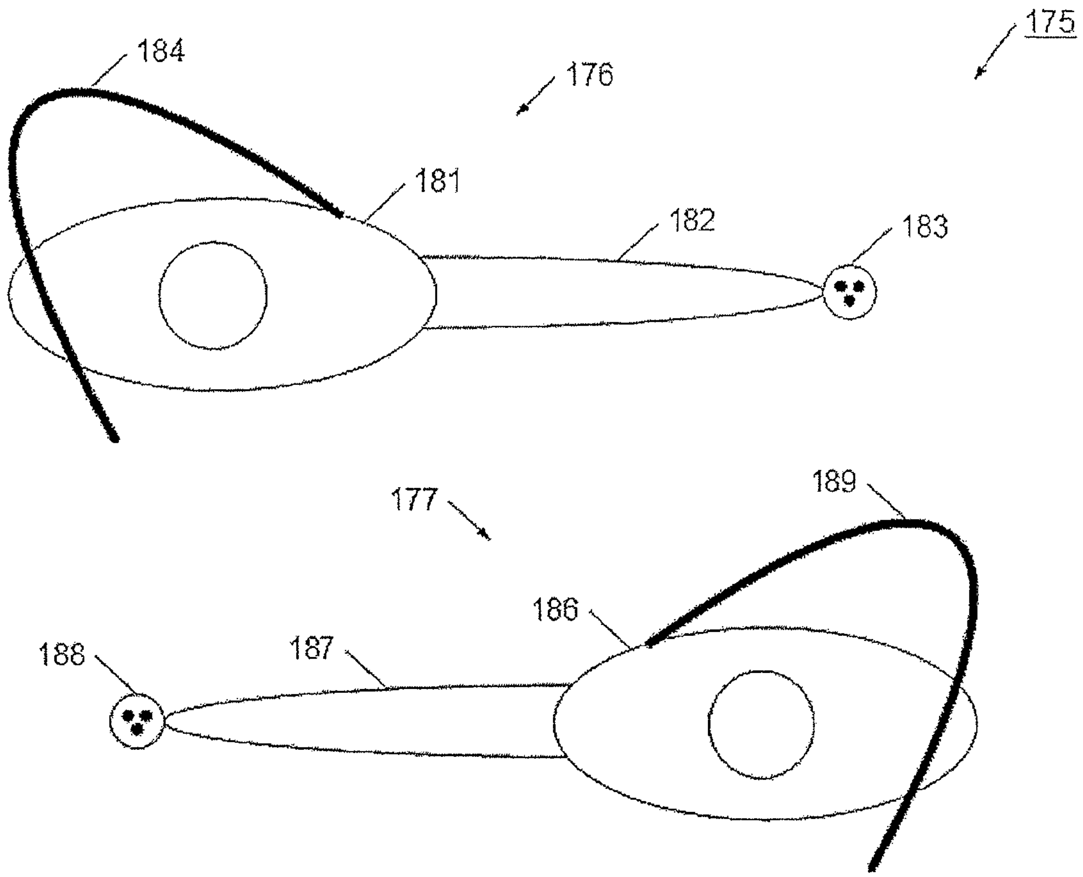
FIG. 6 is a diagram of a wireless earpiece in accordance with the present invention.

Referring now to FIG. 6, a wireless headset system 175 is illustrated. Wireless headset system 175 has a first earpiece 176 and a second earpiece 177. In this way, a user positions one earpiece on the left ear, and positions the other earpiece on the right ear. The first earpiece 176 has an ear clip 184 for coupling to one of the user's ears. A housing 181 has a boom microphone 182 with a microphone 183 positioned at its distal end. The second earpiece has an ear clip 189 for attaching to the user's other ear, and a housing 186 with a boom microphone 187 having a second microphone 188 at its distal end. Housing 181 holds a local radio, such as a Bluetooth radio, for communicating with a control module. Housing 186 also has a local radio, such as a Bluetooth radio, for communicating with the local control module. Each of the earpieces 176 and 177 communicate a microphone signal to the local module. The local module has a processor for applying a speech separation process, for separating a clean speech signal from acoustic noise. It will also be appreciated that the wireless headset system 175 could be constructed so that one earpiece transmits its microphone signal to the other earpiece, and the other earpiece has a processor for applying the separation algorithm. In this way, a clean speech signal is transmitted to the control module.

In an alternative construction, processor 25 is associated with control module 14. In this arrangement, the radio 27 transmits the signal received from microphone 32 as well as the signal received from microphone 33. The microphone signals are transmitted to the control module using the local radio 27, which may be a Bluetooth radio, which is received by control module 14. The processor 47 may then operate a signal separation algorithm for generating a clean speech signal. In an alternate arrangement, the processor is contained in module electronics 83. In this way, the microphone signals are transmitted through wire 81 to control module 77, and processor in the control module applies the signal separation process.

Figure 7:
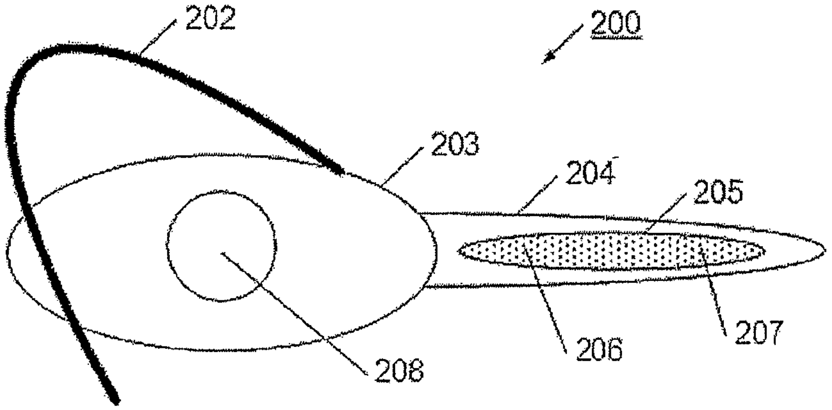
FIG. 7 is a diagram of a wireless earpiece in accordance with the present invention.

Referring now to FIG. 7, a wireless headset system 200 is illustrated. Wireless headset system 200 is in the form of an earpiece having an ear clip 202 for coupling to or around a user's ear. Earpiece 200 has a housing 203 which has a speaker 208. Housing 203 also holds a processor and local radio, such as a Bluetooth radio. The housing 203 also has a boom 204 holding a MEMS microphone array 205. A MEMS (micro electro mechanical systems) microphone is a semiconductor device having multiple microphones arranged on one or more integrated circuit devices. These microphones are relatively inexpensive to manufacture, and have stable and consistent properties making them desirable for headset applications. As illustrated in FIG. 7, several MEMS microphones may be positioned along boom 204. Based on acoustic conditions, particular of the MEMS microphones may be selected to operate as a first microphone 207 and a second microphone 206. For example, a particular set of microphones may be selected based on wind noise, or the desire to increase spatial separation between the microphones. A processor within housing 203 may be used to select and activate particular sets of the available MEMS microphones. It will also be appreciated that the microphone array may be positioned in alternative positions on the housing 203, or may be used to supplement the more traditional transducer style microphones.

Figure 8:
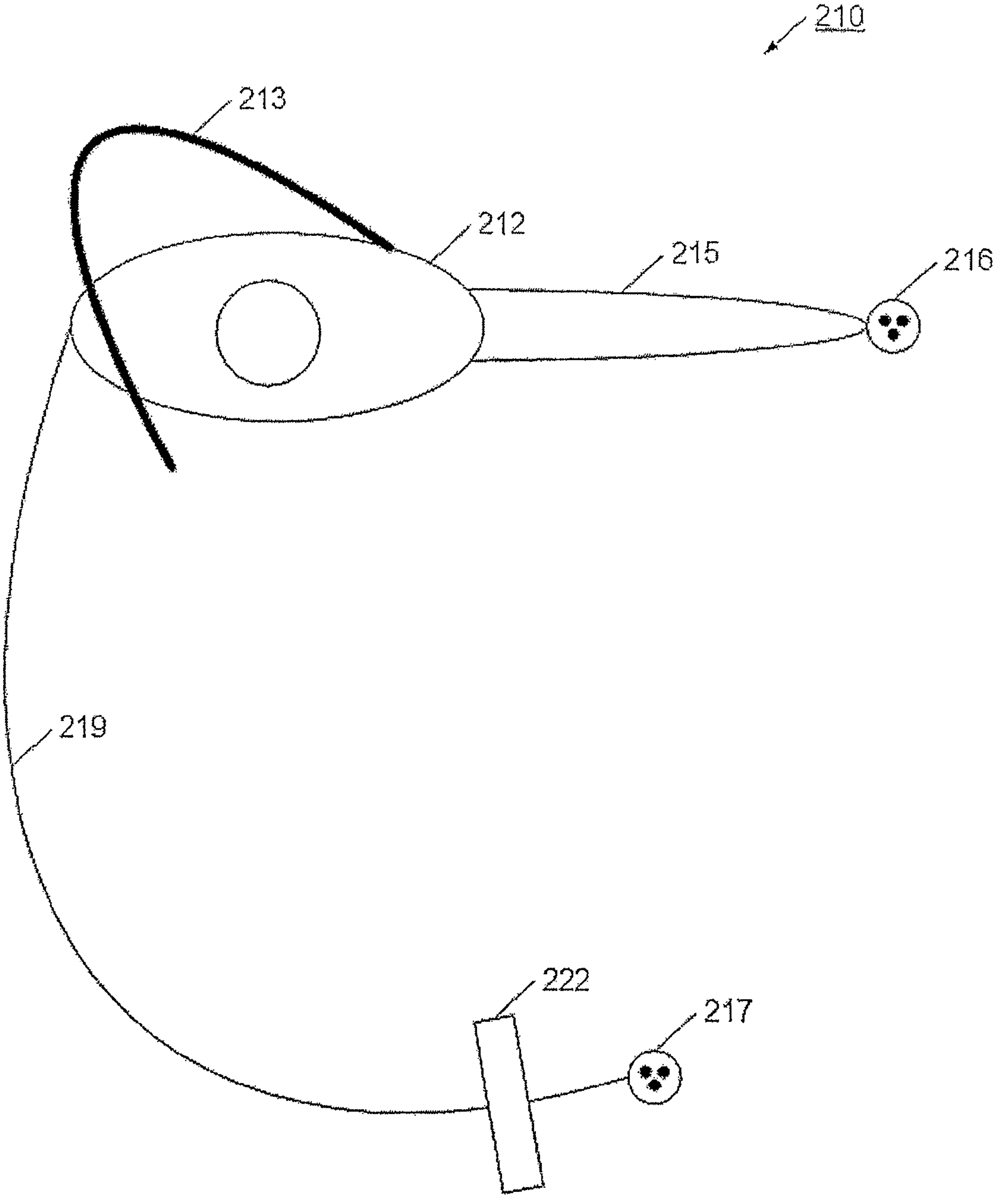
FIG. 8 is a diagram of a wireless earpiece in accordance with the present invention.

Referring now to FIG. 8, a wireless headset system 210 is illustrated. Wireless headset system 210 has an earpiece housing 212 having an earclip 213. The housing 212 holds a processor and local radio, such as a Bluetooth radio. The housing 212 has a boom 215 which has a first microphone 216 at its distal end. A wire 219 connects to the electronics in the housing 212 and has a second housing having a microphone 217 at its distal end. Clip 222 may be provided on wire 219 for more securely attaching the microphone 217 to a user. In use, the first microphone 216 is positioned to have a relatively direct path to the speaker's mouth, while the second microphone 217 is clipped at a position to have different direct audio path to the user. Since the second microphone 217 may be secured a good distance away from speaker's mouth, the microphones 216 and 217 may be spaced relatively far apart, while maintaining an acoustic path to the speaker's mouth. In a preferred use, the second microphone is always placed farther away from the speaker's mouth than the first microphone 216, enabling a simplified signal identification process. However, a user may inadvertently place microphone too close to the mouth, resulting in microphone 216 being farther away. Accordingly, the separation process for headset 210 may require additional sophistication and processes for accounting for the ambiguous placement arrangement of the microphones as well as more powerful BSS algorithms.

Figure 9:
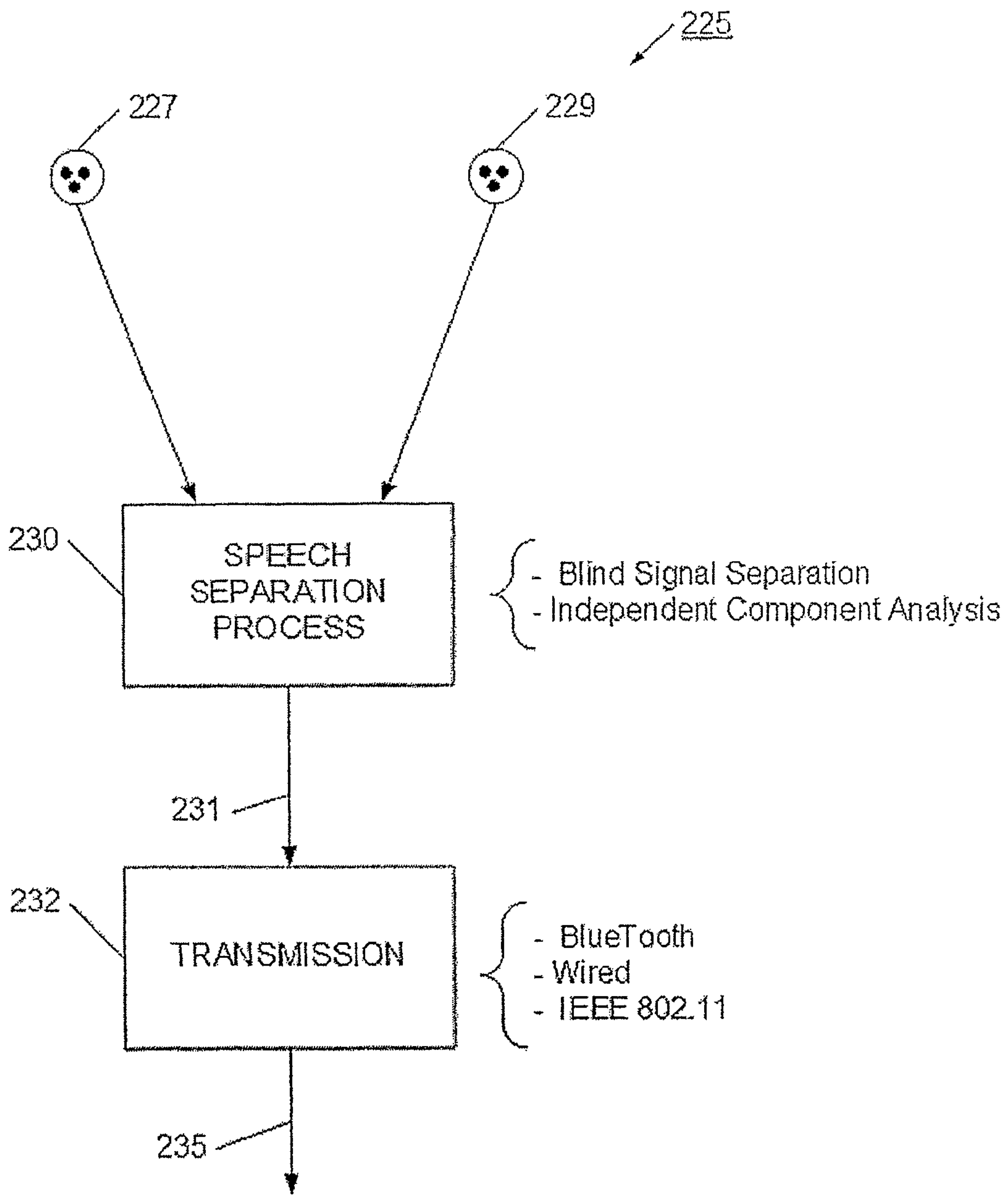
FIG. 9 is a block diagram of a process operating on a headset in accordance with the present invention.

Referring now to FIG. 9, a process 225 is illustrated for operating a communication headset. Process 225 has a first microphone 227 generating a first microphone signal and a second microphone 229 generating a second microphone signal. Although method 225 is illustrated with two microphones, it will be appreciated that more than two microphones and microphone signals may be used. The microphone signals are received into speech separation process 230. Speech separation process 230 may be, for example, a blind signal separation process. In a more specific example, speech separation process 230 may be an independent component analysis process. U.S. patent application Ser. No. 10/897,219, entitled "Separation of Target Acoustic Signals in a Multi-Transducer Arrangement", more fully sets out specific processes for generating a speech signal, and has been incorporated herein in its entirely. Speech separation process 230 generates a clean speech signal 231. Clean speech signal 231 is received into transmission subsystem 232. Transmission subsystem 232 may be for example, a Bluetooth radio, an IEEE 802.11 radio, or a wired connection. Further, it will be appreciated that the transmission may be to a local area radio module, or may be to a radio for a wide area infrastructure. In this way, transmitted signal 235 has information indicative of a clean speech signal.

Figure 10:
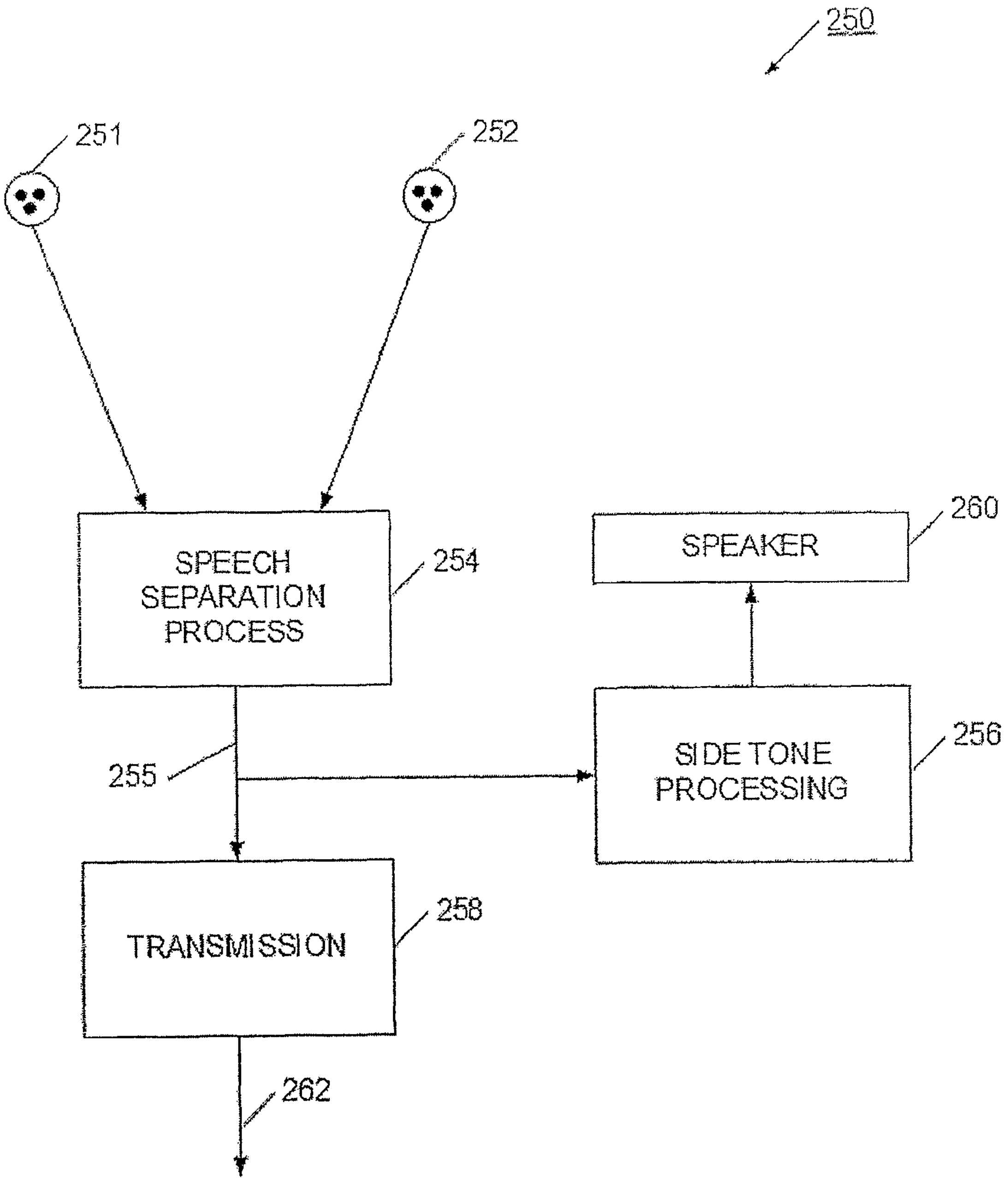
FIG. 10 is a block diagram of a process operating on a headset in accordance with the present invention.

Referring now to FIG. 10, a process 250 for operating a communication headset is illustrated. Communication process 250 has a first microphone 251 providing a first microphone signal to the speech separation process 254. A second microphone 252 provides a second microphone signal into speech separation process 254. Speech separation process 254 generates a clean speech signal 255, which is received into transmission subsystem 258. The transmission subsystem 258, may be for example a Bluetooth radio, an IEEE 802.11 radio, or a wired connection. The transmission subsystem transmits the transmission signal 262 to a control module or other remote radio. The clean speech signal 255 is also received by a side tone processing module 256. Side tone processing module 256 feeds an attenuated clean speech signal back to local speaker 260. In this way, the earpiece on the headset provides a more natural audio feedback to the user. It will be appreciated that side tone processing module 256 may adjust the volume of the side tone signal sent to speaker 260 responsive to local acoustic conditions. For example, the speech separation process 254 may also output a signal indicative of noise volume. In a locally noisy environment, the side tone processing module 256 may be adjusted to output a higher level of clean speech signal as feedback to the user. It will be appreciated that other factors may be used in setting the attenuation level for the side tone processing signal.

Figure 11:
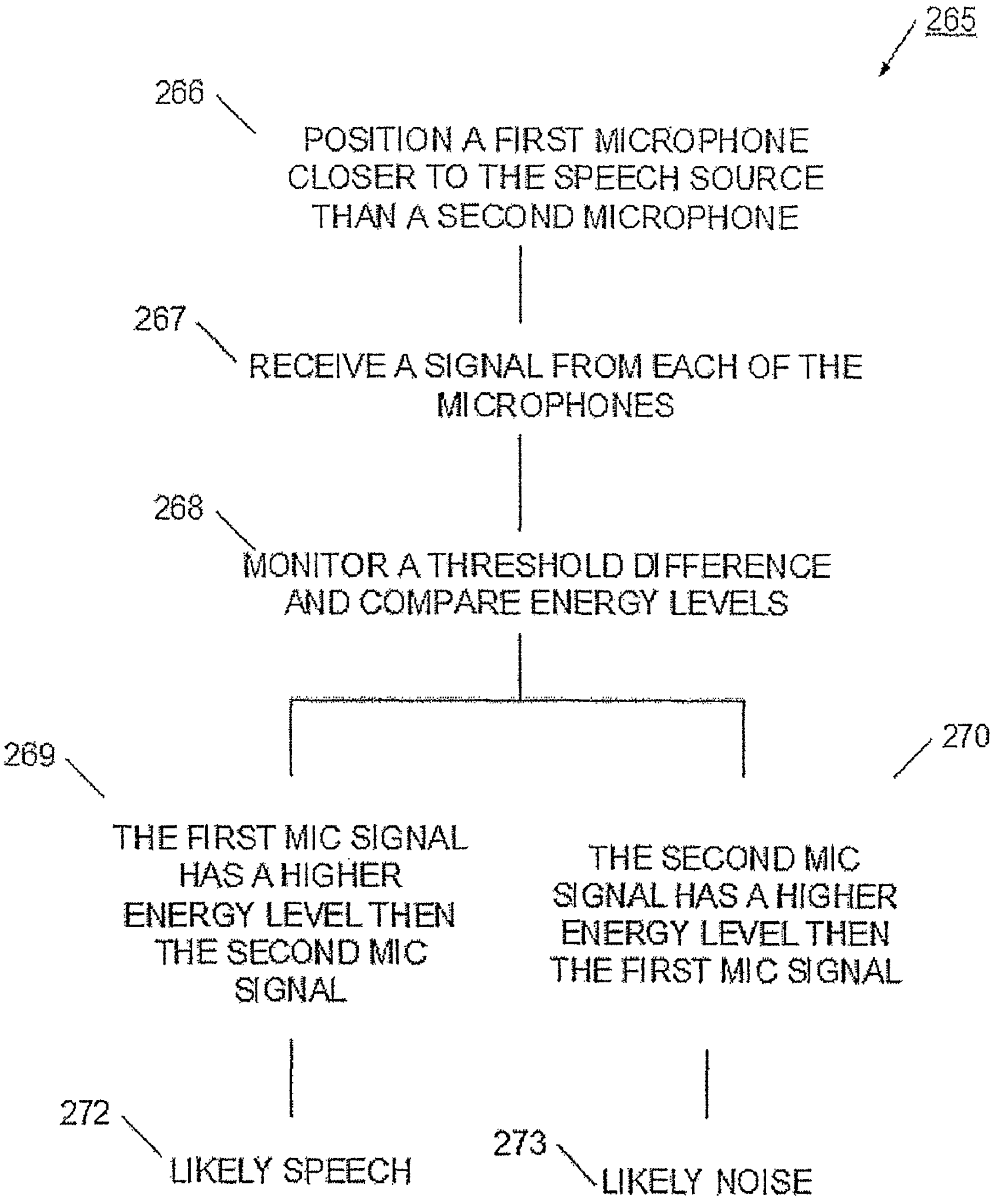
FIG. 11 is a block diagram of a voice detection process in accordance with the present invention.

The signal separation process for the wireless communication headset may benefit from a robust and accurate voice activity detector. A particularly robust and accurate voice activity detection (VAD) process is illustrated in FIG. 11. VAD process 265 has two microphones, with a first one of the microphones positioned on the wireless headset so that it is closer to the speaker's mouth than the second microphone, as shown in block 266. Each respective microphone generates a respective microphone signal, as shown in block 267. The voice activity detector monitors the energy level in each of the microphone signals, and compares the measured energy level, as shown in block 268. In one simple implementation, the microphone signals are monitored for when the difference in energy levels between signals exceeds a predefined threshold. This threshold value may be static, or may adapt according to the acoustic environment. By comparing the magnitude of the energy levels, the voice activity detector may accurately determine if the energy spike was caused by the target user speaking. Typically, the comparison results in either:

(1) The first microphone signal having a higher energy level then the second microphone signal, as shown in block 269. The difference between the energy levels of the signals exceeds the predefined threshold value. Since the first microphone is closer to the speaker, this relationship of energy levels indicates that the target user is speaking, as shown in block 272; a control signal may be used to indicate that the desired speech signal is present or (2) The second microphone signal having a higher energy level then the first microphone signal, as shown in block 270. The difference between the energy levels of the signals exceeds the predefined threshold value. Since the first microphone is closer to the speaker, this relationship of energy levels indicates that the target user is not speaking, as shown in block 273; a control signal may be used to indicate that the signal is noise only.

Figure 13:
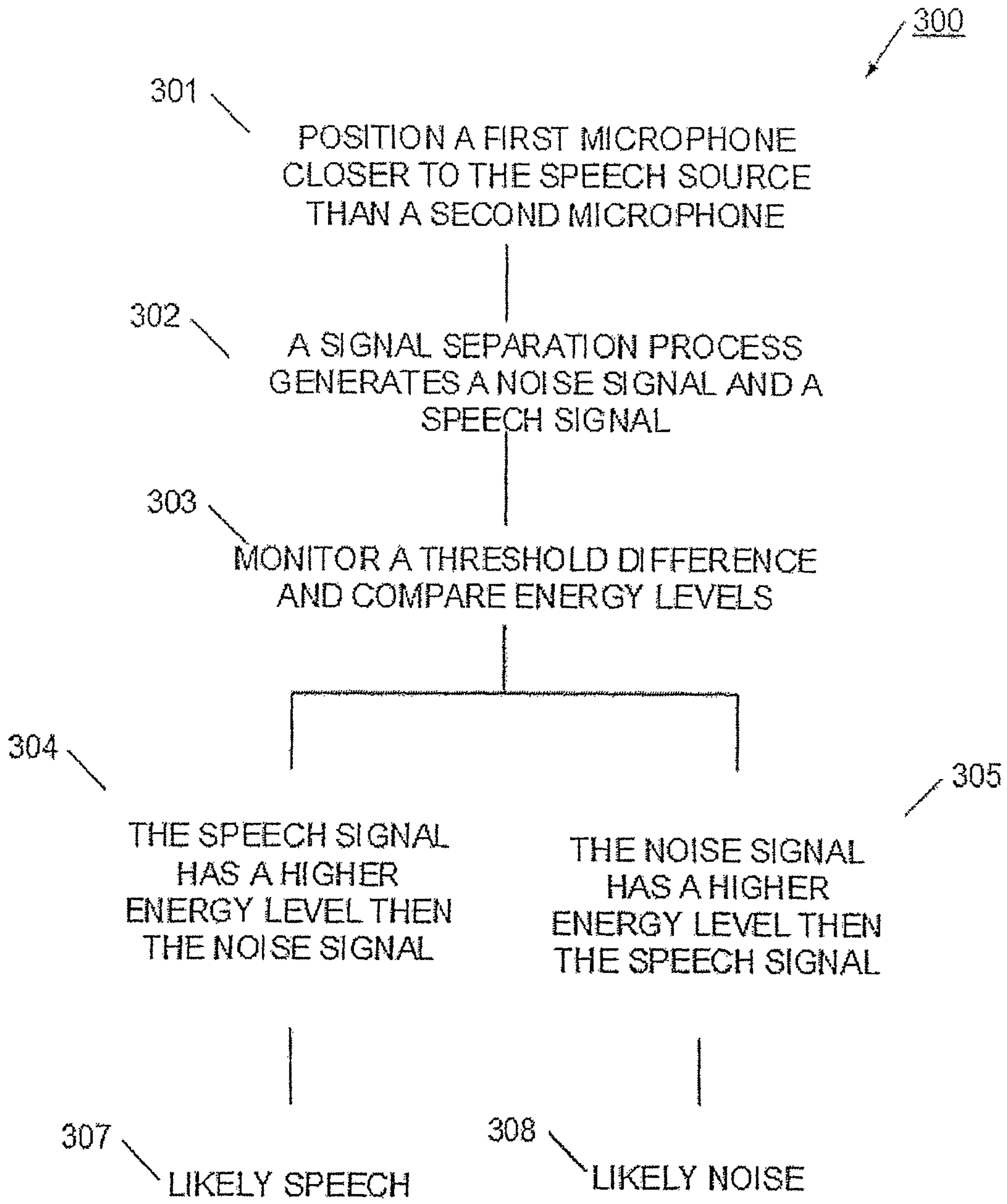
FIG. 13 is a block diagram of a voice detection process in accordance with the present invention.

Indeed since one microphone is closer to the user's mouth, its speech content will be louder in that microphone and the user's speech activity can be tracked by an accompanying large energy difference between the two recorded microphone channels. Also since the BSS/ICA stage removes the user's speech from the other channel, the energy difference between channels may become even larger at the BSS/ICA output level. A VAD using the output signals from the BSS/ICA process is shown in FIG. 13. VAD process 300 has two microphones, with a first one of the microphones positioned on the wireless headset so that it is closer to the speaker's mouth than the second microphone, as shown in block 301. Each respective microphone generates a respective microphone signal, which is received into a signal separation process. The signal separation process generates a noise-dominant signal, as well as a signal having speech content, as shown in block 302. The voice activity detector monitors the energy level in each of the signals, and compares the measured energy level, as shown in block 303. In one simple implementation, the signals are monitored for when the difference in energy levels between the signals exceeds a predefined threshold. This threshold value may be static, or may adapt according to the acoustic environment. By comparing the magnitude of the energy levels, the voice activity detector may accurately determine if the energy spike was caused by the target user speaking. Typically, the comparison results in either:

(1) The speech-content signal having a higher energy level then the noise-dominant signal, as shown in block 304. The difference between the energy levels of the signals exceeds the predefined threshold value. Since it is predetermined that the speech-content signal has the speech content, this relationship of energy levels indicates that the target user is speaking, as shown in block 307; a control signal may be used to indicate that the desired speech signal is present; or (2) The noise-dominant signal having a higher energy level then the speech-content signal, as shown in block 305. The difference between the energy levels of the signals exceeds the predefined threshold value. Since it is predetermined that the speech-content signal has the speech content, this relationship of energy levels indicates that the target user is not speaking, as shown in block 308; a control signal may be used to indicate that the signal is noise only.

In another example of a two channel VAD, the processes described with reference to FIG. 11 and FIG. 13 are both used. In this arrangement, the VAD makes one comparison using the microphone signals (FIG. 11) and another comparison using the outputs from the signal separation process (FIG. 13). A combination of energy differences between channels at the microphone recording level and the output of the ICA stage may be used to provide a robust assessment if the current processed frame contains desired speech or not.

The two channel voice detection process 265 has significant advantages over known single channel detectors. For example, a voice over a loudspeaker may cause the single channel detector to indicate that speech is present, while the two channel process 265 will understand that the loudspeaker is farther away than the target speaker hence not giving rise to a large energy difference among channels, so will indicate that it is noise. Since the signal channel VAD based on energy measures alone is so unreliable, its utility was greatly limited and needed to be complemented by additional criteria like zero crossing rates or a priori desired speaker speech time and frequency models. However, the robustness and accuracy of the two channel process 265 enables the VAD to take a central role in supervising, controlling, and adjusting the operation of the wireless headset.

The mechanism in which the VAD detects digital voice samples that do not contain active speech can be implemented in a variety of ways. One such mechanism entails monitoring the energy level of the digital voice samples over short periods (where a period length is typically in the range of about 10 to 30 msec). If the energy level difference between channels exceeds a fixed threshold, the digital voice samples are declared active, otherwise they are declared inactive. Alternatively, the threshold level of the VAD can be adaptive and the background noise energy can be tracked. This too can be implemented in a variety of ways. In one embodiment, if the energy in the current period is sufficiently larger than a particular threshold, such as the background noise estimate by a comfort noise estimator, the digital voice samples are declared active, otherwise they are declared inactive.

In a single channel VAD utilizing an adaptive threshold level, speech parameters such as the zero crossing rate, spectral tilt, energy and spectral dynamics are measured and compared to values for noise. If the parameters for the voice differ significantly from the parameters for noise, it is an indication that active speech is present even if the energy level of the digital voice samples is low. In the present embodiment, comparison can be made between the differing channels, particularly the voice-centric channel (e.g., voice+noise or otherwise) in comparison to an other channel, whether this other channel is the separated noise channel, the noise centric channel which may or may not have been enhanced or separated (e.g., noise+voice), or a stored or estimated value for the noise.

Although measuring the energy of the digital voice samples can be sufficient for detecting inactive speech, the spectral dynamics of the digital voice samples against a fixed threshold may be useful in discriminating between long voice segments with audio spectra and long term background noise. In an exemplary embodiment of a VAD employing spectral analysis, the VAD performs auto-correlations using Itakura or Itakura-Saito distortion to compare long term estimates based on background noise to short term estimates based on a period of digital voice samples. In addition, if supported by the voice encoder, line spectrum pairs (LSPs) can be used to compare long term LSP estimates based on background noise to short terms estimates based on a period of digital voice samples. Alternatively, FFT methods can be used when the spectrum is available from another software module.

Preferably, hangover should be applied to the end of active periods of the digital voice samples with active speech. Hangover bridges short inactive segments to ensure that quiet trailing; unvoiced sounds (such as /s/) or low SNR transition content are classified as active. The amount of hangover can be adjusted according to the mode of operation of the VAD. If a period following a long active period is clearly inactive (i.e., very low energy with a spectrum similar to the measured background noise) the length of the hangover period can be reduced. Generally, a range of about 20 to 500 msec of inactive speech following an active speech burst will be declared active speech due to hangover. The threshold may be adjustable between approximately −100 and approximately −30 dBm with a default value of between approximately −60 dBm to about −50 dBm, the threshold depending on voice quality, system efficiency and bandwidth requirements, or the threshold level of hearing. Alternatively, the threshold may be adaptive to be a certain fixed or varying value above or equal to the value of the noise (e.g., from the other channel(s)).

In an exemplary embodiment, the VAD can be configured to operate in multiple modes so as to provide system tradeoffs between voice quality, system efficiency and bandwidth requirements. In one mode, the VAD is always disabled and declares all digital voice samples as active speech. However, typical telephone conversations have as much as sixty percent silence or inactive content. Therefore, high bandwidth gains can be realized if digital voice samples are suppressed during these periods by an active VAD. In addition, a number of system efficiencies can be realized by the VAD, particularly an adaptive VAD, such as energy savings, decreased processing requirements, enhanced voice quality or improved user interface. An active VAD not only attempts to detect digital voice samples containing active speech, a high quality VAD can also detect and utilize the parameters of the digital voice (noise) samples (separated or unseparated), including the value range between the noise and the speech samples or the energy of the noise or voice. Thus, an active VAD, particularly an adaptive VAD, enables a number of additional features which increase system efficiency, including modulating the separation and/or post-(pre-) processing steps. For example, a VAD which identifies digital voice samples as active speech can switch on or off the separation process or any pre-/post-processing step, or alternatively, applying different or combinations of separation and/or processing techniques. If the VAD does not identify active speech, the VAD can also modulate different processes including attenuating or canceling background noise, estimating the noise parameters or normalizing or modulating the signals and/or hardware parameters.

Figure 12:
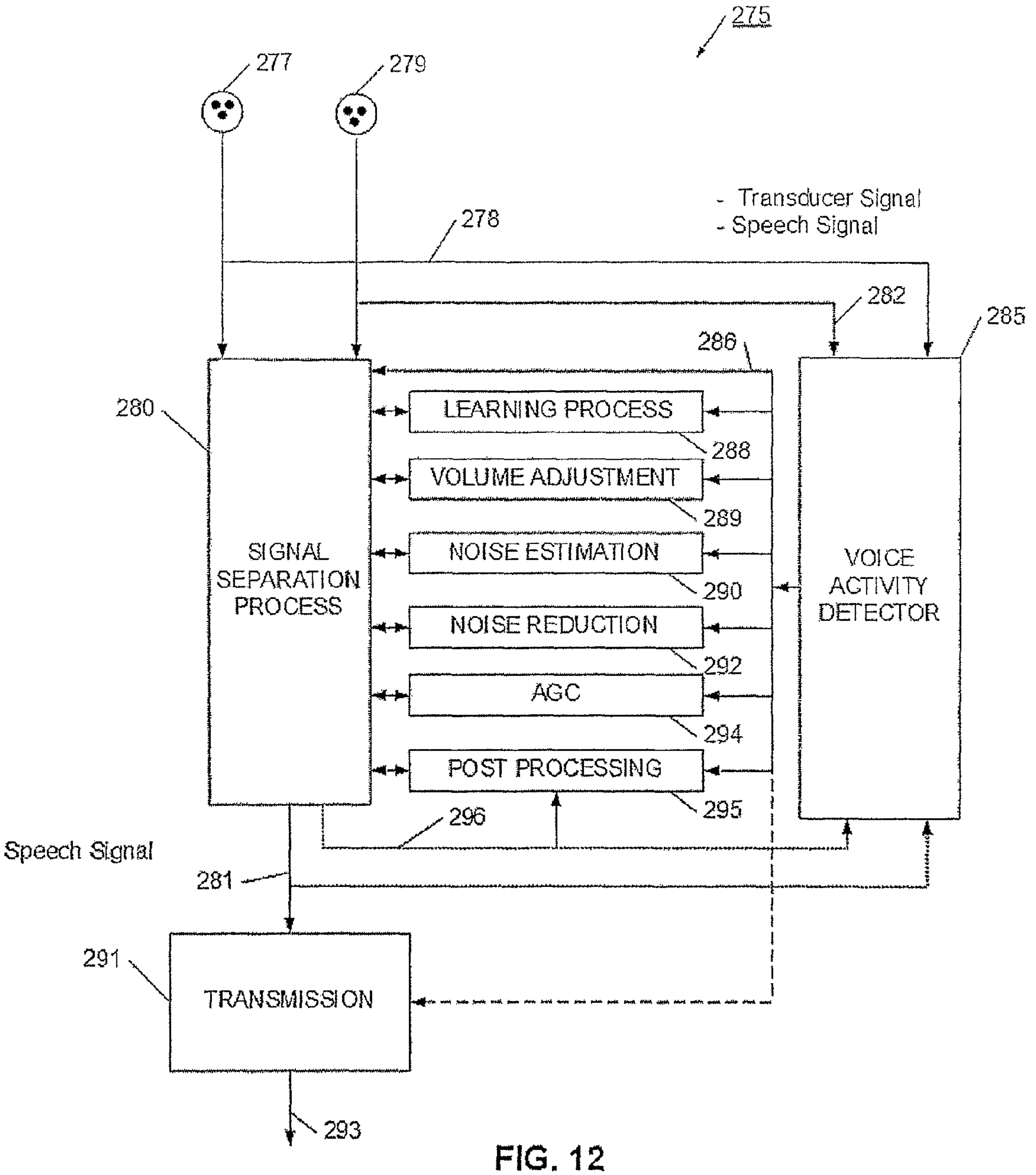
FIG. 12 is a block diagram of a process operating on a headset in accordance with the present invention.

Referring now to FIG. 12, a communication process 275 is illustrated. Communication process 275 has a first microphone 277 generating a first microphone signal 278 that is received into the speech separation process 280. Second microphone 279 generates a second microphone signal 282 which is also received into speech separation process 280. In one configuration, the voice activity detector 285 receives first microphone signal 278 and second microphone signal 282. It will be appreciated that the microphone signals may be filtered, digitized, or otherwise processed. The first microphone 277 is positioned closer to the speaker's mouth than microphone 279. This predefined arrangement enables simplified identification of the speech signal, as well as improved voice activity detection. For example, the two channel voice activity detector 285 may operate a process similar to the process described with reference to FIG. 11 or FIG. 13. The general design of voice activity detection circuits are well known, and therefore will not be described in detail. Advantageously, voice activity detector 285 is a two channel voice activity detector, as described with reference to FIG. 11 or 13. This means that VAD 285 is particularly robust and accurate for reasonable SNRs, and therefore may confidently be used as a core control mechanism in the communication process 275. When the two channel voice activity detector 285 detects speech, it generates control signal 286.

Control signal 286 may be advantageously used to activate, control, or adjust several processes in communication process 275. For example, speech separation process 280 may be adaptive and learn according to the specific acoustic environment. Speech separation process 280 may also adapt to particular microphone placement, the acoustic environment, or a particular user's speech. To improve the adaptability of the speech separation process, the learning process 288 may be activated responsive to the voice activity control signal 286. In this way, the speech separation process only applies its adaptive learning processes when speech is likely occurring. Also, by deactivating the learning processing when only noise is present, (or alternatively, absent), processing and battery power may be conserved.

For purposes of explanation, the speech separation process will be described as an independent component analysis (ICA) process. Generally, the ICA module is not able to perform its main separation function in any time interval when the desired speaker is not speaking, and therefore may be turned off. This "on" and "off" state can be monitored and controlled by the voice activity detection module 285 based on comparing energy content between input channels or desired speaker a priori knowledge such as specific spectral signatures. By turning the ICA off when speech is not present, the ICA filters do not inappropriately adapt, thereby enabling adaptation only when such adaptation will be able to achieve a separation improvement. Controlling adaptation of ICA filters allows the ICA process to achieve and maintain good separation quality even after prolongated periods of desired speaker silence and avoid algorithm singularities due to unfruitful separation efforts for addressing situations the ICA stage cannot solve. Various ICA algorithms exhibit different degrees of robustness or stability towards isotropic noise but turning off the ICA stage during desired speaker absence, (or alternatively, noise absence), adds significant robustness or stability to the methodology. Also, by deactivating the ICA processing when only noise is present, processing and battery power may be conserved.

Since infinite impulsive response filters are used in one example for the ICA implementation, stability of the combined/learning process cannot be guaranteed at all times in a theoretic manner. The highly desirable efficiency of the IIR filter system compared to an FIR filter with the same performance i.e. equivalent ICA FIR filters are much longer and require significantly higher MIPS as well as the absence of whitening artifacts with the current IIR filter structure, are however attractive and a set of stability checks that approximately relate to the pole placement of the closed loop system are included, triggering a reset of the initial conditions of the filter history as well as the initial conditions of the ICA filters. Since IIR filtering itself can result in non bounded outputs due to accumulation of past filter errors (numeric instability), the breadth of techniques used in finite precision coding to check for instabilities can be used. The explicit evaluation of input and output energy to the ICA filtering stage is used to detect anomalies and reset the filters and filtering history to values provided by the supervisory module.

In another example, the voice activity detector control signal 286 is used to set a volume adjustment 289. For example, volume on speech signal 281 may be substantially reduced at times when no voice activity is detected. Then, when voice activity is detected, the volume may be increased on speech signal 281. This volume adjustment may also be made on the output of any post processing stage. This not only provides for a better communication signal, but also saves limited battery power. In a similar manner, noise estimation processes 290 may be used to determine when noise reduction processes may be more aggressively operated when no voice activity is detected. Since the noise estimation process 290 is now aware of when a signal is only noise, it may more accurately characterize the noise signal. In this way, noise processes can be better adjusted to the actual noise characteristics, and may be more aggressively applied in periods with no speech. Then, when voice activity is detected, the noise reduction processes may be adjusted to have a less degrading effect on the speech signal. For example, some noise reduction processes are known to create undesirable artifacts in speech signal, although they are may be highly effective in reducing noise. These noise processes may be operated when no speech signal is present, but may be disabled or adjusted when speech is likely present.

In another example, the control signal 286 may be used to adjust certain noise reduction processes 292. For example, noise reduction process 292 may be a spectral subtraction process. More particularly, signal separation process 280 generates a noise signal 296 and a speech signal 281. The speech signal 281 may have still have a noise component, and since the noise signal 296 accurately characterizes the noise, the spectral subtraction process 292 may be used to further remove noise from the speech signal. However, such a spectral subtraction also acts to reduce the energy level of the remaining speech signal. Accordingly, when the control signal indicates that speech is present, the noise reduction process may be adjusted to compensate for the spectral subtraction by applying a relatively small amplification to the remaining speech signal. This small level of amplification results in a more natural and consistent speech signal. Also, since the noise reduction process 292 is aware of how aggressively the spectral subtraction was performed, the level of amplification can be accordingly adjusted.

The control signal 286 may also be used to control the automatic gain control (AGC) function 294. The AGC is applied to the output of the speech signal 281, and is used to maintain the speech signal in a usable energy level. Since the AGC is aware of when speech is present, the AGC can more accurately apply gain control to the speech signal. By more accurately controlling or normalizing the output speech signal, post processing functions may be more easily and effectively applied. Also, the risk of saturation in post processing and transmission is reduced. It will be understood that the control signal 286 may be advantageously used to control or adjust several processes in the communication system, including other post processing 295 functions.

In an exemplary embodiment, the AGC can be either fully adaptive or have a fixed gain. Preferably, the AGC supports a fully adaptive operating mode with a range of about −30 dB to 30 dB. A default gain value may be independently established, and is typically 0 dB. If adaptive gain control is used, the initial gain value is specified by this default gain. The AGC adjusts the gain factor in accordance with the power level of an input signal 281. Input signals 281 with a low energy level are amplified to a comfortable sound level, while high energy signals are attenuated.

A multiplier applies a gain factor to an input signal which is then output. The default gain, typically 0 dB is initially applied to the input signal. A power estimator estimates the short term average power of the gain adjusted signal. The short term average power of the input signal is preferably calculated every eight samples, typically every one ms for a 8 kHz signal. Clipping logic analyzes the short term average power to identify gain adjusted signals whose amplitudes are greater than a predetermined clipping threshold. The clipping logic controls an AGC bypass switch, which directly connects the input signal to the media queue when the amplitude of the gain adjusted signal exceeds the predetermined clipping threshold. The AGC bypass switch remains in the up or bypass position until the AGC adapts so that the amplitude of the gain adjusted signal falls below the clipping threshold.

In the described exemplary embodiment, the AGC is designed to adapt slowly, although it should adapt fairly quickly if overflow or clipping is detected. From a system point of view, AGC adaptation should be held fixed or designed to attenuate or cancel the background noise if the VAD determines that voice is inactive.

In another example, the control signal 286 may be used to activate and deactivate the transmission subsystem 291. In particular, if the transmission subsystem 291 is a wireless radio, the wireless radio need only be activated or fully powered when voice activity is detected. In this way, the transmission power may be reduced when no voice activity is detected. Since the local radio system is likely powered by battery, saving transmission power gives increased usability to the headset system. In one example, the signal transmitted from transmission system 291 is a Bluetooth signal 293 to be received by a corresponding Bluetooth receiver in a control module.

Figure 14:
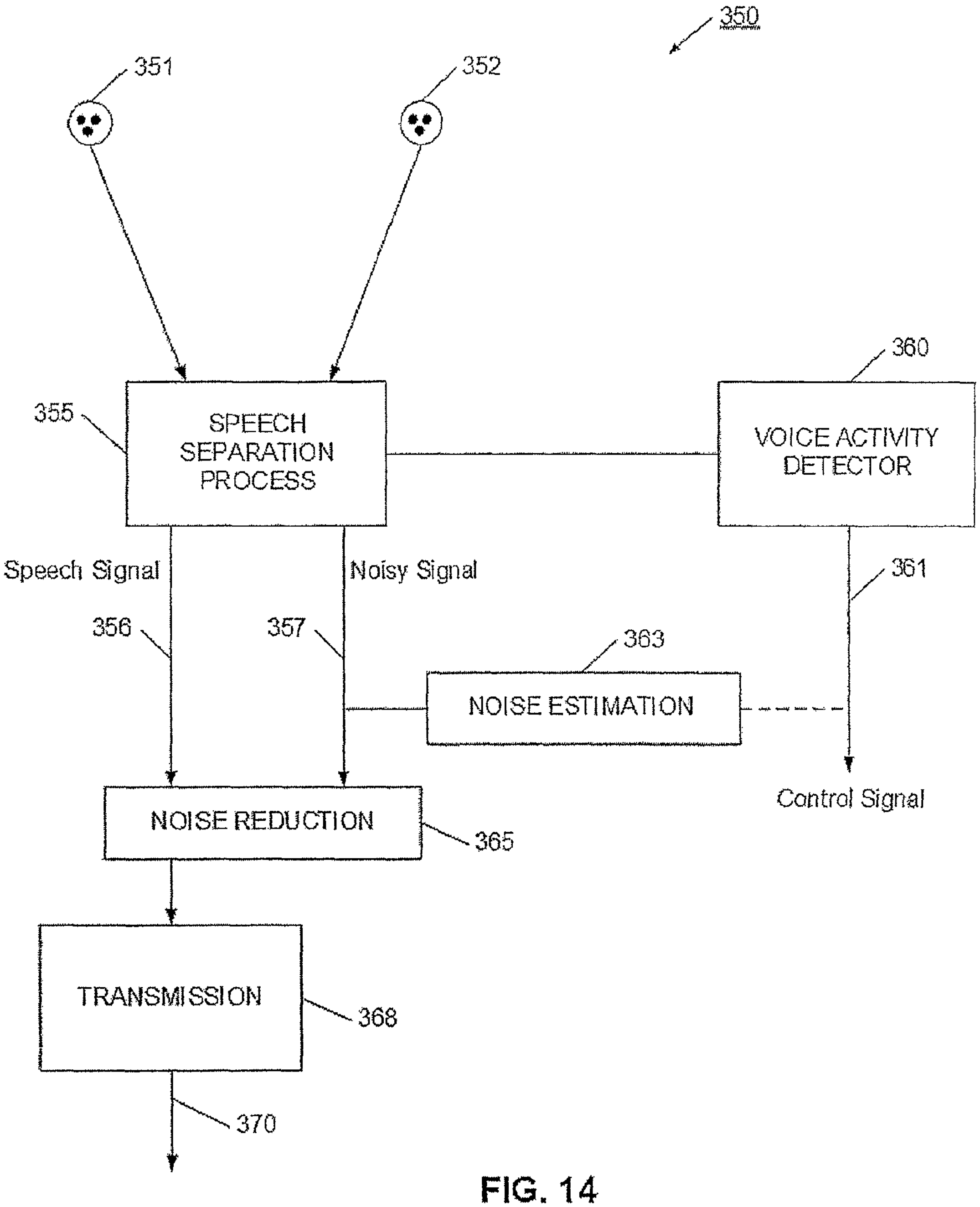
FIG. 14 is a block diagram of a process operating on a headset in accordance with the present invention.

Referring now to FIG. 14, a communication process 350 is illustrated. Communication process 350 has a first microphone 351 providing the first microphone signal to a speech separation process 355. A second microphone 352 provides a second microphone signal to speech separation process 355. The speech separation process 355 generates a relatively clean speech signal 356 as well as a signal indicative of the acoustic noise 357. A two channel voice activity detector 360 receives a pair of signals from the speech separation process for determining when speech is likely occurring, and generates a control signal 361 when speech is likely occurring. The voice activity detector 360 operates a VAD process as described with reference to FIG. 11 or FIG. 13. The control signal 361 may be used to activate or adjust a noise estimation process 363. If the noise estimation process 363 is aware of when the signal 357 is likely not to contain speech, the noise estimation process 363 may more accurately characterize the noise. This knowledge of the characteristics of the acoustic noise may then be used by noise reduction process 365 to more fully and accurately reduce noise. Since the speech signal 356 coming from speech separation process may have some noise component, the additional noise reduction process 365 may further improve the quality of the speech signal. In this way the signal received by transmission process 368 is of a better quality with a lower noise component. It will also be appreciated that the control signal 361 may be used to control other aspects of the communication process 350, such as the activation of the noise reduction process or the transmission process, or activation of the speech separation process. The energy of the noise sample (separated or unseparated) can be utilized to modulate the energy of the output enhanced voice or the energy of speech of the far end user. In addition, the VAD can modulate the parameters of the signals before, during and after the invention process.

In general, the described separation process uses a set of at least two spaced-apart microphones. In some cases, it is desirable that the microphones have a relatively direct path to the speaker's voice. In such a path, the speaker's voice travels directly to each microphone, without any intervening physical obstruction. In other cases, the microphones may be placed so that one has a relatively direct path, and the other is faced away from the speaker. It will be appreciated that specific microphone placement may be done according to intended acoustic environment, physical limitations, and available processing power, for example. The separation process may have more than two microphones for applications requiring more robust separation, or where placement constraints cause more microphones to be useful. For example, in some applications it may be possible that a speaker may be placed in a position where the speaker is shielded from one or more microphones. In this case, additional microphones would be used to increase the likelihood that at least two microphones would have a relatively direct path to the speaker's voice. Each of the microphones receives acoustic energy from the speech source as well as from the noise sources, and generates a composite microphone signal having both speech components and noise components. Since each of the microphones is separated from every other microphone, each microphone will generate a somewhat different composite signal. For example, the relative content of noise and speech may vary, as well as the timing and delay for each sound source.

The composite signal generated at each microphone is received by a separation process. The separation process processes the received composite signals and generates a speech signal and a signal indicative of the noise. In one example, the separation process uses an independent component analysis (ICA) process for generating the two signals. The ICA process filters the received composite signals using cross filters, which are preferably infinitive impulse response filters with nonlinear bounded functions. The nonlinear bounded functions are nonlinear functions with pre-determined maximum and minimum values that can be computed quickly, for example a sign function that returns as output either a positive or a negative value based on the input value. Following repeated feedback of signals, two channels of output signals are produced, with one channel dominated with noise so that it consists substantially of noise components, while the other channel contains a combination of noise and speech. It will be understood that other ICA filter functions and processes may be used consistent with this disclosure. Alternatively, the present invention contemplates employing other source separation techniques. For example, the separation process could use a blind signal source (BSS) process, or an application specific adaptive filter process using some degree of a priori knowledge about the acoustic environment to accomplish substantially similar signal separation.

In a headset arrangement, the relative position of the microphones may be known in advance, with this position information being useful in identifying the speech signal. For example, in some microphone arrangements, one of the microphones is very likely to be the closest to the speaker, while all the other microphones will be further away. Using this pre-defined position information, an identification process can pre-determine which of the separated channels will be the speech signal, and which will be the noise-dominant signal. Using this approach has the advantage of being able to identify which is the speech channel and which is the noise-dominant channel without first having to significantly process the signals. Accordingly, this method is efficient and allows for fast channel identification, but uses a more defined microphone arrangement, so is less flexible. In headsets, microphone placement may be selected so that one of the microphones is nearly always the closest to the speaker's mouth. The identification process may still apply one or more of the other identification processes to assure that the channels have been properly identified.

Figure 15:
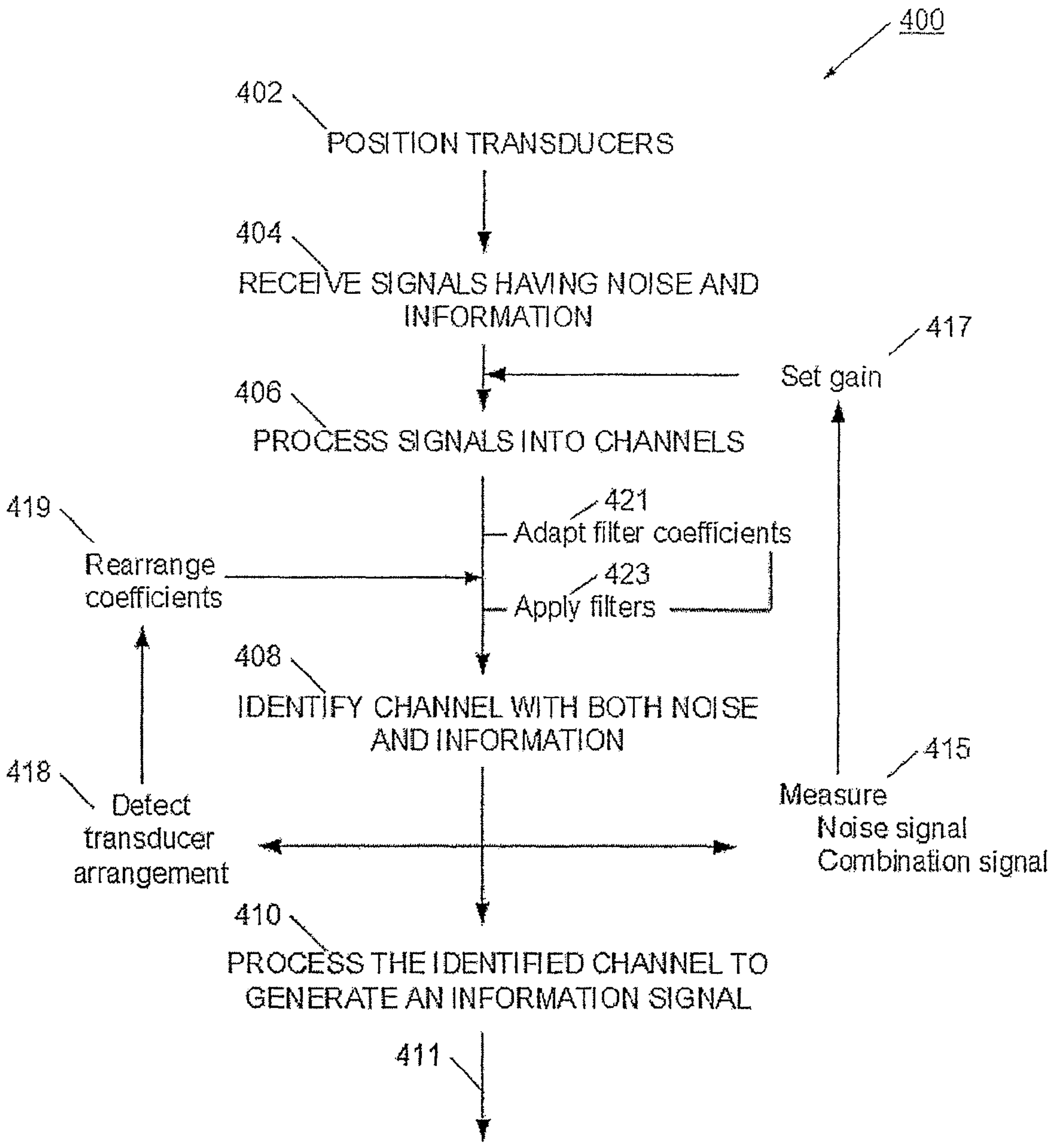
FIG. 15 is a flowchart of a separation process in accordance with the present invention.

Referring now to FIG. 15, a specific separation process 400 is illustrated. Process 400 positions transducers to receive acoustic information and noise, and generate composite signals for further processing as shown in blocks 402 and 404. The composite signals are processed into channels as shown in block 406. Often, process 406 includes a set of filters with adaptive filter coefficients. For example, if process 406 uses an ICA process, then process 406 has several filters, each having an adaptable and adjustable filter coefficient. As the process 406 operates, the coefficients are adjusted to improve separation performance, as shown in block 421, and the new coefficients are applied and used in the filter as shown in block 423. This continual adaptation of the filter coefficients enables the process 406 to provide a sufficient level of separation, even in a changing acoustic environment.

The process 406 typically generates two channels, which are identified in block 408. Specifically, one channel is identified as a noise-dominant signal, while the other channel is identified as a speech signal, which may be a combination of noise and information. As shown in block 415, the noise-dominant signal or the combination signal can be measured to detect a level of signal separation. For example, the noise-dominant signal can be measured to detect a level of speech component, and responsive to the measurement, the gain of microphone may be adjusted. This measurement and adjustment may be performed during operation of the process 400, or may be performed during set-up for the process. In this way, desirable gain factors may be selected and predefined for the process in the design, testing, or manufacturing process, thereby relieving the process 400 from performing these measurements and settings during operation. Also, the proper setting of gain may benefit from the use of sophisticated electronic test equipment, such as high-speed digital oscilloscopes, which are most efficiently used in the design, testing, or manufacturing phases. It will be understood that initial gain settings may be made in the design, testing, or manufacturing phases, and additional tuning of the gain settings may be made during live operation of the process 100.

Figure 16:
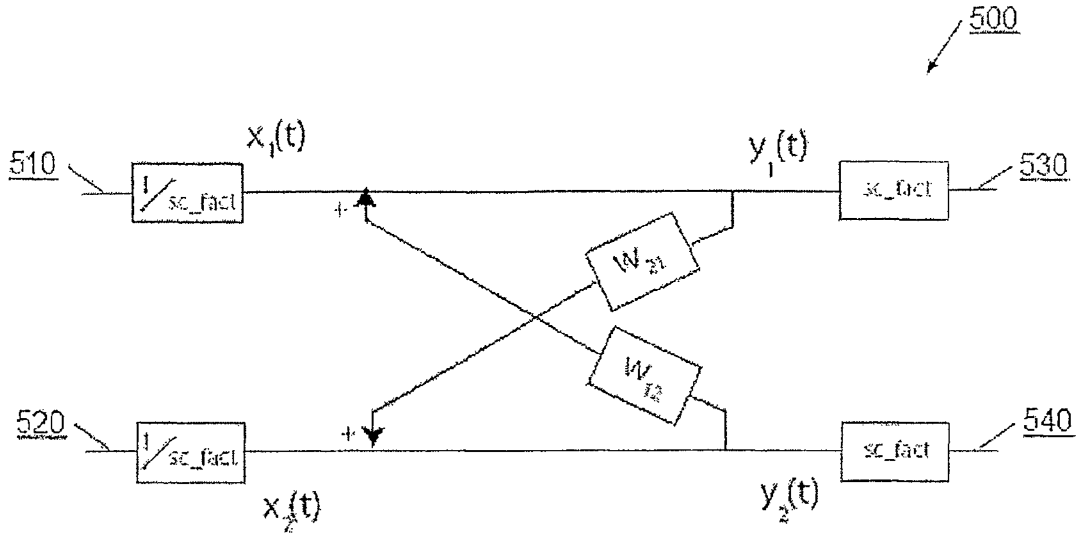
FIG. 16 is a block diagram of one embodiment of an improved ICA processing sub-module in accordance with the present invention.
Figure 17:
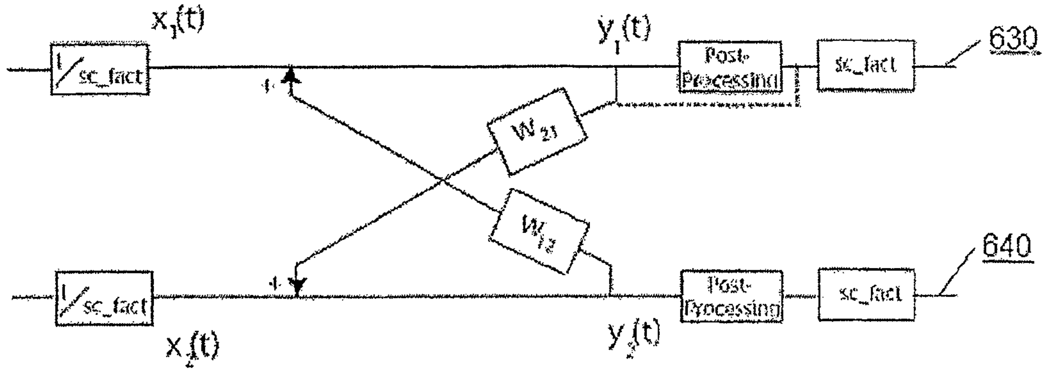
FIG. 17 is a block diagram of one embodiment of an improved ICA speech separation process in accordance with the present invention.

FIG. 16 illustrates one embodiment 500 of an ICA or BSS processing function. The ICA processes described with reference to FIGS. 16 and 17 are particularly well suited to headset designs as illustrated in FIGS. 5, 6, and 7. These constructions have a well defined and predefined positioning of the microphones, and allow the two speech signals to be extracted from a relatively small "bubble" in front of the speaker's mouth. Input signals $X_1$ and $X_2$ are received from channels 510 and 520, respectively. Typically, each of these signals would come from at least one microphone, but it will be appreciated other sources may be used. Cross filters $W_{12}$ and $W_{21}$ are applied to each of the input signals to produce a channel 530 of separated signals $U_1$ and a channel 540 of separated signals $U_2$. Channel 530 (speech channel) contains predominantly desired signals and channel 540 (noise channel) contains predominantly noise signals. It should be understood that although the terms "speech channel" and "noise channel" are used, the terms "speech" and "noise" are interchangeable based on desirability, e.g., it may be that one speech and/or noise is desirable over other speeches and/or noises. In addition, the method can also be used to separate the mixed noise signals from more than two sources.

Infinitive impulse response filters are preferably used in the present processing process. An infinitive impulse response filter is a filter whose output signal is fed back into the filter as at least a part of an input signal. A finite impulse response filter is a filter whose output signal is not feedback as input. The cross filters $W_{21}$ and $W_{12}$ can have sparsely distributed coefficients over time to capture a long period of time delays. In a most simplified form, the cross filters $W_{21}$ and $W_{12}$ are gain factors with only one filter coefficient per filter, for example a delay gain factor for the time delay between the output signal and the feedback input signal and an amplitude gain factor for amplifying the input signal. In other forms, the cross filters can each have dozens, hundreds or thousands of filter coefficients. As described below, the output signals $U_1$ and $U_2$ can be further processed by a post processing sub-module, a de-noising module or a speech feature extraction module.

Although the ICA learning rule has been explicitly derived to achieve blind source separation, its practical implementation to speech processing in an acoustic environment may lead to unstable behavior of the filtering scheme. To ensure stability of this system, the adaptation dynamics of $W_{12}$ and similarly $W_{21}$ have to be stable in the first place. The gain margin for such a system is low in general meaning that an increase in input gain, such as encountered with non stationary speech signals, can lead to instability and therefore exponential increase of weight coefficients. Since speech signals generally exhibit a sparse distribution with zero mean, the sign function will oscillate frequently in time and contribute to the unstable behavior. Finally since a large learning parameter is desired for fast convergence, there is an inherent trade-off between stability and performance since a large input gain will make the system more unstable. The known learning rule not only lead to instability, but also tend to oscillate due to the nonlinear sign function, especially when approaching the stability limit, leading to reverberation of the filtered output signals $Y_1(t)$ and $Y_2(t)$. To address these issues, the adaptation rules for $W_{12}$ and $W_{21}$ need to be stabilized. If the learning rules for the filter coefficients are stable and the closed loop poles of the system transfer function from X to U are located within the unit circle, extensive analytical and empirical studies have shown that systems are stable in the BIBO (bounded input bounded output). The final corresponding objective of the overall processing scheme will thus be blind source separation of noisy speech signals under stability constraints.

The principal way to ensure stability is therefore to scale the input appropriately. In this framework the scaling factor sc_fact is adapted based on the incoming input signal characteristics. For example, if the input is too high, thus will lead to an increase in sc_fact, thus reducing the input amplitude. There is a compromise between performance and stability. Scaling the input down by sc_fact reduces the SNR which leads to diminished separation performance. The input should thus only be scaled to a degree necessary to ensure stability. Additional stabilizing can be achieved for the cross filters by running a filter architecture that accounts for short term fluctuation in weight coefficients at every sample, thereby avoiding associated reverberation. This adaptation rule filter can be viewed as time domain smoothing. Further filter smoothing can be performed in the frequency domain to enforce coherence of the converged separating filter over neighboring frequency bins. This can be conveniently done by zero tapping the K-tap filter to length L, then Fourier transforming this filter with increased time support followed by Inverse Transforming. Since the filter has effectively been windowed with a rectangular time domain window, it is correspondingly smoothed by a sinc function in the frequency domain. This frequency domain smoothing can be accomplished at regular time intervals to periodically reinitialize the adapted filter coefficients to a coherent solution.

The following equations are examples of an ICA filter structure that can be used for each time sample t and with k being a time increment variable $$Y_1(t)=X_1(t)+W_{12}(t)\otimes Y_2(t) \quad \text{(Eq. 1)}$$

$$Y_2(t)=X_2(t)+W_{21}(t)\otimes Y_1(t) \quad \text{(Eq. 2)}$$

$$\Delta W_{12}k=-f(Y_1(t))\times Y_2(t-k) \quad \text{(Eq. 3)}$$

$$\Delta W_{12}k=-f(Y_2(t))\times Y_1(t-k) \quad \text{(Eq. 4)}$$

The function f(x) is a nonlinear bounded function, namely a nonlinear function with a predetermined maximum value and a predetermined minimum value. Preferably, f(x) is a nonlinear bounded function which quickly approaches the maximum value or the minimum value depending on the sign of the variable x. For example, a sign function can be used as a simple bounded function. A sign function f(x) is a function with binary values of 1 or −1 depending on whether x is positive or negative. Example nonlinear bounded functions include, but are not limited to:

$$f(x)=\operatorname{sign}(x)=\left\{\begin{array}{c|c} 1 & x>0 \\ -1 & x\le 0 \end{array}\right\} \quad \text{(Eq. 7)}$$

$$f(x)=\tanh(x)=\frac{e^x-e^{-x}}{e^x+e^{-x}} \quad \text{(Eq. 8)}$$

$$f(x)=\operatorname{simple}(x)=\left\{\begin{array}{c|c} 1 & x\ge\varepsilon \\ x/\varepsilon & -\varepsilon>x>\varepsilon \\ -1 & x\le-\varepsilon \end{array}\right\} \quad \text{(Eq. 9)}$$

These rules assume that floating point precision is available to perform the necessary computations. Although floating point precision is preferred, fixed point arithmetic may be employed as well, more particularly as it applies to devices with minimized computational processing capabilities. Notwithstanding the capability to employ fixed point arithmetic, convergence to the optimal ICA solution is more difficult. Indeed the ICA algorithm is based on the principle that the interfering source has to be cancelled out. Because of certain inaccuracies of fixed point arithmetic in situations when almost equal numbers are subtracted (or very different numbers are added), the ICA algorithm may show less than optimal convergence properties.

Another factor which may affect separation performance is the filter coefficient quantization error effect. Because of the limited filter coefficient resolution, adaptation of filter coefficients will yield gradual additional separation improvements at a certain point and thus a consideration in determining convergence properties. The quantization error effect depends on a number of factors but is mainly a function of the filter length and the bit resolution used. The input scaling issues listed previously are also necessary in finite precision computations where they prevent numerical overflow. Because the convolutions involved in the filtering process could potentially add up to numbers larger than the available resolution range, the scaling factor has to ensure the filter input is sufficiently small to prevent this from happening.

The present processing function receives input signals from at least two audio input channels, such as microphones. The number of audio input channels can be increased beyond the minimum of two channels. As the number of input channels increases, speech separation quality may improve, generally to the point where the number of input channels equals the number of audio signal sources. For example, if the sources of the input audio signals include a speaker, a background speaker, a background music source, and a general background noise produced by distant road noise and wind noise, then a four-channel speech separation system will normally outperform a two-channel system. Of course, as more input channels are used, more filters and more computing power are required. Alternatively, less than the total number of sources can be implemented, so long as there is a channel for the desired separated signal(s) and the noise generally.

The present processing sub-module and process can be used to separate more than two channels of input signals. For example, in a cellular phone application, one channel may contain substantially desired speech signal, another channel may contain substantially noise signals from one noise source, and another channel may contain substantially audio signals from another noise source. For example, in a multi-user environment, one channel may include speech predominantly from one target user, while another channel may include speech predominantly from a different target user. A third channel may include noise, and be useful to further process the two speech channels. It will be appreciated that additional speech or target channels may be useful.

Although some applications involve only one source of desired speech signals, in other applications there may be multiple sources of desired speech signals. For example, teleconference applications or audio surveillance applications may require separating the speech signals of multiple speakers from background noise and from each other. The present process can be used to not only separate one source of speech signals from background noise, but also to separate one speaker's speech signals from another speaker's speech signals. The present invention will accommodate multiple sources so long as at least one microphone has a relatively direct path with the speaker. If such a direct path cannot be obtained like in the headset application where both microphones are located near the user's ear and the direct acoustic path to the mouth is occluded by the user's cheek, the present invention will still work since the user's speech signal is still confined to a reasonably small region in space (speech bubble around mouth).

The present process separates sound signals into at least two channels, for example one channel dominated with noise signals (noise-dominant channel) and one channel for speech and noise signals (combination channel). As shown in FIG. 17, channel 630 is the combination channel and channel 640 is the noise-dominant channel. It is quite possible that the noise-dominant channel still contains some low level of speech signals. For example, if there are more than two significant sound sources and only two microphones, or if the two microphones are located close together but the sound sources are located far apart, then processing alone might not always fully separate the noise. The processed signals therefore may need additional speech processing to remove remaining levels of background noise and/or to further improve the quality of the speech signals. This is achieved by feeding the separated outputs through a single or multi channel speech enhancement algorithm, for example, a Wiener filter with the noise spectrum estimated using the noise-dominant output channel (a VAD is not typically needed as the second channel is noise-dominant only). The Wiener filter may also use non-speech time intervals detected with a voice activity detector to achieve better SNR for signals degraded by background noise with long time support. In addition, the bounded functions are only simplified approximations to the joint entropy calculations, and might not always reduce the signals' information redundancy completely. Therefore, after signals are separated using the present separation process, post processing may be performed to further improve the quality of the speech signals.

Based on the reasonable assumption that the noise signals in the noise-dominant channel have similar signal signatures as the noise signals in the combination channel, those noise signals in the combination channel whose signatures are similar to the signatures of the noise-dominant channel signals should be filtered out in the speech processing functions. For example, spectral subtraction techniques can be used to perform such processing. The signatures of the signals in the noise channel are identified. Compared to prior art noise filters that rely on predetermined assumptions of noise characteristics, the speech processing is more flexible because it analyzes the noise signature of the particular environment and removes noise signals that represent the particular environment. It is therefore less likely to be over-inclusive or under-inclusive in noise removal. Other filtering techniques such as Wiener filtering and Kalman filtering can also be used to perform speech post-processing. Since the ICA filter solution will only converge to a limit cycle of the true solution, the filter coefficients will keep on adapting without resulting in better separation performance. Some coefficients have been observed to drift to their resolution limits. A post-processed version of the ICA output containing the desired speaker signal is fed back through the IIR feedback structure as illustrated. The convergence limit cycle is overcome without destabilizing the ICA algorithm. A beneficial byproduct of this procedure is that convergence is accelerated considerably.

With the ICA process generally explained, certain specific features are made available to the headset or earpiece devices. For example, the general ICA process is adjusted to provide an adaptive reset mechanism. As described above, the ICA process has filters which adapt during operation. As these filters adapt, the overall process may eventually become unstable, and the resulting signal becomes distorted or saturated. Upon the output signal becoming saturated, the filters need to be reset, which may result in an annoying "pop" in the generated signal. In one particularly desirable arrangement, the ICA process has a learning stage and an output stage. The learning stage employs a relatively aggressive ICA filter arrangement, but its output is used only to "teach" the output stage. The output stage provides a smoothing function, and more slowly adapts to changing conditions. In this way, the learning stage quickly adapts and directs the changes made to the output stage, while the output stage exhibits an inertia or resistance to change. The ICA reset process monitors values in each stage, as well as the final output signal. Since the learning stage is operating aggressively, it is likely that the learning stage will saturate more often than the output stage. Upon saturation, the learning stage filter coefficients are reset to a default condition, and the learning ICA has its filter history replaced with current sample values. However, since the output of the learning ICA is not directly connected to any output signal, the resulting "glitch" does not cause any perceptible or audible distortion. Instead, the change merely results in a different set of filter coefficients being sent to the output stage. But, since the output stage changes relatively slowly, it too, does not generate any perceptible or audible distortion. By resetting only the learning stage, the ICA process is made to operate without substantial distortion due to resets. Of course, the output stage may still occasionally need to be reset, which may result in the usual "pop". However, the occurrence is now relatively rare.

Further, a reset mechanism is desired that will create a stable separating ICA filtered output with minimal distortion and discontinuity perception in the resulting audio by the user. Since the saturation checks are evaluated on a batch of stereo buffer samples and after ICA filtering, the buffers should be chosen as small as practical since reset buffers from the ICA stage will be discarded and there is not enough time to redo the ICA filtering in the current sample period. The past filter history is reinitialized for both ICA filter stages with the current recorded input buffer values. The post processing stage will receive the current recorded speech+noise signal and the current recorded noise channel signal as reference. Since the ICA buffer sizes can be reduced to 4 ms, this results in an imperceptible discontinuity in the desired speaker voice output.

When the ICA process is started or reset, the filter values or taps are reset to predefined values. Since the headset or earpiece often has only a limited range of operating conditions, the default values for the taps may be selected to account for the expected operating arrangement. For example, the distance from each microphone to the speaker's mouth is usually held in a small range, and the expected frequency of the speaker's voice is likely to be in a relatively small range. Using these constraints, as well as actual operation values, a set of reasonably accurate tap values may be determined. By carefully selecting default values, the time for the ICA to perform expectable separation is reduced. Explicit constraints on the range of filter taps to constrain the possible solution space should be included. These constraints may be derived from directivity considerations or experimental values obtained through convergence to optimal solutions in previous experiments. It will also be appreciated that the default values may adapt over time and according to environmental conditions.

It will also be appreciated that a communication system may have more than one set of default values. For example, one set of default values may be used in a very noisy environment, and another set of default values may be used in a more quite environment. In another example, different sets of default values may be stored for different users. If more than one set of default values is provided, than a supervisory module will be included that determines the current operating environment, and determines which of the available default value sets will be used. Then, when the reset command is received, the supervisory process will direct the selected default values to the ICA process and store new default values for example in Flash memory on a chipset.

Any approach starting the separation optimization from a set of initial conditions is used to speed up convergence. For any given scenario, a supervisory module should decide if a particular set of initial conditions is suitable and implement it.

Acoustic echo problems arise naturally in a headset because the microphone(s) may be located close to the ear speaker due to space or design limitation. For example, in FIG. 1, microphone 32 is close to ear speaker 19. As speech from the far end user is played at the ear speaker, this speech will also be picked up by the microphones(s) and echoed back to the far end user. Depending on the volume of the ear speaker and location of the microphone(s), this undesired echo can be loud and annoying.

The acoustic echo can be considered as interfering noise and removed by the same processing algorithm. The filter constraints on one cross filter reflect the need for removing the desired speaker from one channel and limit its solution range. The other crossfilter removes any possible outside interferences and the acoustic echo from a loudspeaker. The constraints on the second crossfilter taps are therefore determined by giving enough adaptation flexibility to remove the echo. The learning rate for this crossfilter may need to be changed too and may be different from the one needed for noise suppression. Depending on the headset setup, the relative position of the ear speaker to the microphones may be fixed. The necessary second crossfilter to remove the ear speaker speech can be learned in advanced and fixed. On the other hand, the transfer characteristics of the microphone may drift over time or as the environment such as temperature changes. The position of the microphones may be adjustable to some degree by the user. All these require an adjustment of the crossfilter coefficients to better eliminate the echo. These coefficients may be constrained during adaptation to be around the fixed learned set of coefficients.

The same algorithm as described in equations (1) to (4) can be used to remove the acoustic echo. Output $Y_1$ will be the desired near end user speech without echo. $Y_2$ will be the noise reference channel with speech from the near end user removed.

Conventionally, the acoustics echo is removed from the microphone signal using the adaptive normalized least mean square (NLMS) algorithm and the far end signal as reference. Silence of the near end user needs to be detected and the signal picked up by the microphone is then assumed to contain only echo. The NLMS algorithm builds a linear filter model of the acoustic echo using the far end signal as the filter input, and the microphone signal as filter output. When it is detected that the both the far and near end users are talking, the learned filter is frozen and applied to the incoming far end signal to generate an estimate of the echo. This estimated echo is then subtracted from the microphone signal and the resulted signal is sent as echo cleaned.

The drawbacks of the above scheme are that it requires good detection of silence of near end user. This could be difficult to achieve if the user is in a noisy environment. The above scheme also assumes a linear process in the incoming far end electrical signal to the ear speaker to microphone pick-up path. The ear speaker is seldom a linear device when converting the electric signal to sound. The non-linear effect is pronounced when the speaker is driven at high volume. It may be saturated, produce harmonics or distortion. Using a two microphones setup, the distorted acoustic signal from the ear speaker will be picked up by both microphones. The echo will be estimated by the second cross-filter as $Y_2$ and removed from the primary microphone by the first cross-filter. This results in an echo free signal $Y_1$. This scheme eliminates the need to model the non-linearity of the far end signal to microphone path. The learning rules (3-4) operate regardless if the near end user is silent. This gets rid of a double talk detector and the cross-filters can be updated throughout the conversation.

In a situation when a second microphone is not available, the near end microphone signal and the incoming far end signal can be used as the input $X_1$ and $X_2$. The algorithm described in this patent can still be applied to remove the echo. The only modification is the weights $W_{21k}$ be all set zero as the far end signal $X_2$ would not contain any near end speech. Learning rule (4) will be removed as a result. Though the non-linearity issue will not be solved in this single microphone setup, the cross-filter can still be updated throughout the conversation and there is no need for a double talk detector. In either the two microphones or single microphone configuration, conventional echo suppression methods can still be applied to remove any residual echo. These methods include acoustic echo suppression and complementary comb filtering. In complementary comb filtering, signal to the ear speaker is first passed through the bands of comb filter. The microphone is coupled to a complementary comb filter whose stop bands are the pass band of the first filter. In the acoustic echo suppression, the microphone signal is attenuated by 6 dB or more when the near end user is detected to be silence.

The communication processes often have post-processing steps where additional noise is removed from the speech-content signal. In one example, a noise signature is used to spectrally subtract noise from the speech signal. The aggressiveness of the subtraction is controlled by the over-saturation-factor (OSF). However, aggressive application of spectral subtraction may result in an unpleasant or unnatural speech signal. To reduce the required spectral subtraction, the communication process may apply scaling to the input to the ICA/BSS process. To match the noise signature and amplitude in each frequency bin between voice+noise and noise-only channels, the left and right input channels may be scaled with respect to each other so a close as possible model of the noise in the voice+noise channel is obtained from the noise channel, Instead of tuning the Over-Subtraction Factor (OSF) factor in the processing stage, this scaling generally yields better voice quality since the ICA stage is forced to remove as much directional components of the isotropic noise as possible. In a particular example, the noise-dominant signal may be more aggressively amplified when additional noise reduction is needed. In this way, the ICA/BSS process provides additional separation, and less post processing is needed.

Real microphones may have frequency and sensitivity mismatch while the ICA stage may yield incomplete separation of high/low frequencies in each channel. Individual scaling of the OSF in each frequency bin or range of bins may therefore be necessary to achieve the best voice quality possible. Also, selected frequency bins may be emphasized or de-emphasized to improve perception.

The input levels from the microphones may also be adjusted according to a desired ICA/BSS learning rate or to allow more effective application of post processing methods. The ICA/BSS and post processing sample buffers evolve through a diverse range of amplitudes. Downscaling of the ICA learning rate is desirable at high input levels. For example, at high input levels, the ICA filter values may rapidly change, and more quickly saturate or become unstable. By scaling or attenuating the input signals, the learning rate may be appropriately reduced. Downscaling of the post processing input is also desirable to avoid computing rough estimates of speech and noise power resulting in distortion. To avoid stability and overflow issues in the ICA stage as well as to benefit from the largest possible dynamic range in the post processing stage, adaptive scaling of input data to ICA/BSS and post processing stages may be applied. In one example, sound quality may be enhanced overall by suitably choosing high intermediate stage output buffer resolution compared to the DSP input/output resolution.

Input scaling may also be used to assist in amplitude calibration between the two microphones. As described earlier, it is desirable that the two microphones be properly matched. Although some calibration may be done dynamically, other calibrations and selections may be done in the manufacturing process. Calibration of both microphones to match frequency and overall sensitivities should be performed to minimize tuning in ICA and post processing stage. This may require inversion of the frequency response of one microphone to achieve the response of another. All techniques known in the literature to achieve channel inversion, including blind channel inversion, can be used to this end. Hardware calibration can be performed by suitably matching microphones from a pool of production microphones. Offline or online tuning can be considered. Online tuning will require the help of the VAD to adjust calibration settings in noise-only time intervals, i.e. the microphone frequency range needs to be excited preferentially by white noise to be able to correct all frequencies.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A headset, comprising:

a housing;

an ear speaker;

a first microphone connected to the housing;

a second microphone connected to the housing;

a radio; and a processor coupled to the first and the second microphones, and configured to:

receive a first signal from the first microphone, the first signal having a noise component and a speech component;

receive a second signal from the second microphone, the second signal having a noise component and a speech component;

separate the first and second signals into a first and a second channel using a blind-source separation process, wherein one of the channels provides a noise signal comprising substantially only noise components and the other channel provides a combination signal comprising both noise components and speech components;

identify which of the first or second channels has the combination signal;

process the combination signal to generate a speech signal; and transmit the speech signal, wherein the speech signal is transmitted to the radio, and wherein the radio operates according to a Bluetooth standard.

2. The headset according to claim 1, further including remote control module, and wherein the speech signal is transmitted to the remote control module.

3. The headset according to claim 1, further including a side tone circuit, and wherein the speech signal is in part transmitted to the side tone circuit and played on the ear speaker.

4. The wireless headset according to claim 1, further comprising:

a second housing;

a second ear speaker in the second housing; and wherein the first microphone is in the first housing and the second microphone is in the second housing.

5. The wireless headset according to claim 1, wherein the ear speaker, first microphone, and the second microphone are in the housing.

6. The wireless headset according to claim 5, further including positioning at least one on the microphones to face a different wind direction than the other microphone.

7. The wireless headset according to claim 1, wherein the first microphone is constructed to be positioned at least three inches from a user's mouth.

8. The wireless headset according to claim 1, wherein the first microphone and the second microphone are constructed as MEMS microphones.

9. The wireless headset according to claim 1, wherein the first microphone and the second microphone are selected from a set of MEMS microphones.

10. The wireless headset according to claim 1, wherein the first microphone and the second microphone are positioned so that an input port of the first microphone is orthogonal to an input port of the second microphone.

11. The wireless headset according to claim 1, wherein one of the microphones is spaced apart from the housing.

12. The wireless headset according to claim 1, wherein the blind-source separation process comprises an independent component analysis process.

13. A wireless headset system comprising:

an ear speaker;

a first microphone generating a first transducer signal having a noise component and a speech component;

a second microphone generating a second transducer signal having a noise component and a speech component;

a processor;
a radio; and
a housing, the housing holding the ear speaker and only one of the microphones,
the processor configured to:
receive the first and second transducer signals;
separate the first and second transducer signals into a first and a second channel using a blind-source separation process, wherein one of the channels provides a noise signal comprising substantially only noise components and the other channel provides a combination signal comprising both noise components and speech components;
identify which of the first or second channels has the combination signal;
process the combination signal to generate a speech signal; and
transmit the speech signal.

14. The wireless headset system according to claim 13, wherein the ear speaker and the first microphone are in the same housing, and the second microphone is in another housing.

15. The wireless headset system according to claim 13, further comprising a member for positioning the ear speaker, and a separate housing for holding the first microphone.

16. A wireless headset system comprising:
an ear speaker;
a first microphone generating a first transducer signal having a noise component and a speech component;
a second microphone generating a second transducer signal having a noise component and a speech component;
a processor;
a radio; and
a housing, the housing holding the ear speaker and neither of the microphones,
the processor configured to:
receive the first and second transducer signals;
separate the first and second transducer signals into a first and a second channel using a blind-source separation process, wherein one of the channels provides a noise signal comprising substantially only noise components and the other channel provides a combination signal comprising both noise components and speech components;
identify which of the first or second channels has the combination signal;
process the combination signal to generate a speech signal; and
transmit the speech signal.

17. A wireless headset system comprising:
an ear speaker;
a first microphone generating a first transducer signal having a noise component and a speech component;
a second microphone generating a second transducer signal having a noise component and a speech component;
a processor; and
a radio;
the processor configured to:
receive the first and second transducer signals;
separate the first and second transducer signals into a first and a second channel using a blind-source separation process, wherein one of the channels provides a noise signal comprising substantially only noise components and the other channel provides a combination signal comprising both noise components and speech components;
identify which of the first or second channels has the combination signal;
process the combination signal to generate a speech signal; and
transmit the speech signal,
wherein the processor, the first microphone and the second microphone are in the same housing.

18. The wireless headset system according to claim 17, further comprising a housing, the housing holding the ear speaker and both microphones.

19. The wireless headset system according to claim 17, wherein the radio, the processor, the first microphone and the second microphone are in the same housing.

20. A wireless headset system comprising:
an ear speaker;
a first microphone generating a first transducer signal having a noise component and a speech component;
a second microphone generating a second transducer signal having a noise component and a speech component;
a processor;
a radio;
and a member for positioning the ear speaker and a second ear speaker, the member generally forming a stereo headset,
the processor configured to:
receive the first and second transducer signals;
separate the first and second transducer signals into a first and a second channel using a blind-source separation process, wherein one of the channels provides a noise signal comprising substantially only noise components and the other channel provides a combination signal comprising both noise components and speech components;
identify which of the first or second channels has the combination signal;
process the combination signal to generate a speech signal; and
transmit the speech signal.

* * * * *